United States Patent
Ye et al.

(10) Patent No.: US 11,219,046 B2
(45) Date of Patent: *Jan. 4, 2022

(54) TWO-TONE PHYSICAL UPLINK SHARED CHANNEL FOR MACHINE TYPE COMMUNICATIONS

(71) Applicant: Apple Inc., Cupertino, CA (US)

(72) Inventors: Qiaoyang Ye, Fremont, CA (US); Debdeep Chatterjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,298

(22) Filed: May 9, 2019

(65) Prior Publication Data

US 2019/0373624 A1    Dec. 5, 2019

Related U.S. Application Data

(63) Continuation of application No. 16/277,870, filed on Feb. 15, 2019.

(60) Provisional application No. 62/710,594, filed on Feb. 16, 2018, provisional application No. 62/652,595, (Continued)

(51) Int. Cl.
| | | |
|---|---|---|
| *H04W 72/12* | (2009.01) | |
| *H04W 72/04* | (2009.01) | |
| *H04L 5/00* | (2006.01) | |
| *H04L 1/18* | (2006.01) | |
| *H04W 4/70* | (2018.01) | |
| *H04W 8/24* | (2009.01) | |
| *H04B 17/345* | (2015.01) | |
| *H04B 7/06* | (2006.01) | |
| *H04W 76/27* | (2018.01) | |

(52) U.S. Cl.
CPC ...... *H04W 72/1268* (2013.01); *H04B 7/0626* (2013.01); *H04B 17/345* (2015.01); *H04L 1/1861* (2013.01); *H04L 5/0051* (2013.01); *H04L 5/0053* (2013.01); *H04L 5/0094* (2013.01); *H04W 4/70* (2018.02); *H04W 8/24* (2013.01); *H04W 72/0413* (2013.01); *H04W 76/27* (2018.02)

(58) Field of Classification Search
CPC .. H04L 1/1861; H04W 72/04; H04W 72/0446
See application file for complete search history.

(56) References Cited

U.S. PATENT DOCUMENTS

| | | | |
|---|---|---|---|
| 9,661,492 B2 | 5/2017 | Yavuz et al. | |
| 9,681,482 B2 * | 6/2017 | Yang | H04W 28/18 |
| 10,171,225 B2 * | 1/2019 | Horiuchi | H04L 5/0033 |

(Continued)

OTHER PUBLICATIONS

3GPP, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018), Lte Advanced Pro, 776 pages.

(Continued)

*Primary Examiner* — Raj Jain
(74) *Attorney, Agent, or Firm* — Sterne, Kessler, Goldstein & Fox P.L. L.C.

(57) ABSTRACT

Embodiments of the present disclosure describe configuration and use of sub-physical resource block allocation for physical uplink shared channel and demodulation reference signals. Other embodiments may be described and claimed.

20 Claims, 16 Drawing Sheets

Related U.S. Application Data filed on Apr. 4, 2018, provisional application No. 62/653,975, filed on Apr. 6, 2018.

(56) References Cited

U.S. PATENT DOCUMENTS

| | | |
|---|---|---|
| 2010/0074305 A1* | 3/2010 | Lee .................. H04L 5/0023 375/135 |
| 2016/0072614 A1* | 3/2016 | Blankenship ......... H04L 5/0076 370/329 |
| 2016/0081022 A1 | 3/2016 | Haneji et al. |
| 2017/0126439 A1 | 5/2017 | Yoshimoto et al. |
| 2017/0215201 A1* | 7/2017 | Kim .................. H04L 1/1812 |
| 2018/0199367 A1* | 7/2018 | Jung ............... H04W 72/1268 |
| 2018/0254864 A1* | 9/2018 | Bontu ................. H04B 7/0417 |
| 2019/0007248 A1* | 1/2019 | Takeda ................ H04W 72/12 |
| 2019/0089504 A1* | 3/2019 | Hwang ................ H04L 27/26 |
| 2019/0215849 A1* | 7/2019 | Ye .................... H04L 5/0053 |
| 2019/0373596 A1* | 12/2019 | Saito .................. H04L 5/0048 |
| 2019/0373624 A1* | 12/2019 | Ye ..................... H04W 8/24 |

OTHER PUBLICATIONS

3GPP, "Technical Specification Group Radio Access Network; Evolved Universal Terrestrial Radio Access (E-UTRA); Physical layer; Measurements (Release 15)," 3GPP TS 36.214 V15.0.1 (Jan. 2018), 5G, 23 pages.

3GPP, "Technical Specification Group Radio Access Network; Evolved Universal Terrestrial Radio Access (E-UTRA); User Equipment (UE) radio transmission and reception (Release 15)," 3GPP TS 36.101 V15.1.0 (Dec. 2017), 5G, 1635 pages.

3GPP, "Technical Specification Group Radio Access Network; Evolved Universal Terrestrial Radio Access (E-UTRA); Physical channels and modulation (Release 15)," 3GPP TS 36.211 V15.0.0 (Dec. 2017), 5G, 219 pages.

* cited by examiner

TWO-TONE PHYSICAL UPLINK SHARED CHANNEL FOR MACHINE TYPE COMMUNICATIONS

CROSS REFERENCE TO RELATED APPLICATION

The present application is a continuation of U.S. patent application Ser. No. 16/277,870 filed on Feb. 15, 2019, entitled "TWO-TONE PHYSICAL UPLINK SHARED CHANNEL FOR MACHINE TYPE COMMUNICATIONS," which claims priority to: U.S. Provisional Patent Application No. 62/710,594 filed Feb. 16, 2018, and entitled "Design of 2-Tone Physical Uplink Shared Channel (PUSCH) for Release 15 (Rel-15) Even Further Enhanced Machine Type Communication (EFEMTC)"; U.S. Provisional Patent Application No. 62/652,595 filed Apr. 4, 2018 and entitled "Design of 2-Tone Physical Uplink Shared Channel (PUSCH) for Release 15 (Rel-15) Even Further Enhanced Machine Type Communication (EFEMTC)"; and U.S. Provisional Patent Application No. 62/653,975 filed Apr. 6, 2018 and entitled "Design of 2-Tone Physical Uplink Shared Channel (PUSCH) for Release 15 (Rel-15) Even Further Enhanced Machine Type Communication (EFEMTC)." The entire disclosures of these applications are hereby incorporated by reference in their entireties.

FIELD

Embodiments of the present invention relate generally to the technical field of wireless communications.

BACKGROUND

In Release 13 narrowband Internet of things (NB-IoT), sub-physical resource block (PRB) allocation is supported for physical uplink shared channel (PUSCH) to support higher PUSCH spectral efficiency. Specifically, single-tone allocation is supported for PUSCH with subcarrier spacing of 3.75 kHz, and single-tone allocation and multi-tone allocation with 3, 6, or 12 subcarriers are supported for PUSCH with subcarrier spacing of 15 kHz.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

To increase the PUSCH spectral efficiency for efeMTC, sub-PRB allocation can be supported. For example, 2 adjacent subcarriers out of 3 allocated subcarriers with discrete Fourier transform (DFT)-spread of length two can be used with pi/2 binary shift keying (BPSK) modulation for sub-PRB PUSCH in efeMTC. In this disclosure, various embodiments describe design details of PUSCH with 2 out of 3 subcarriers allocation in efeMTC. Specifically, the design of configuration technique, numerology, resource allocation, the demodulation reference signal (DMRS) design, power control, and support in time division duplex (TDD) systems are discussed.

Figure 1:
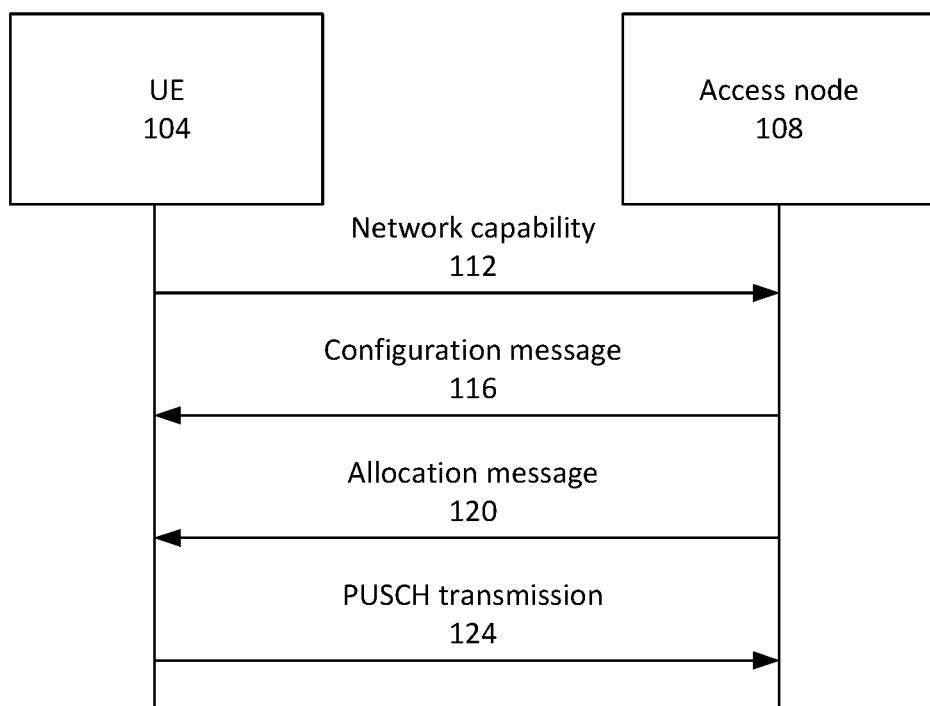
FIG. 1 illustrates a message flow between network devices in accordance with some embodiments.

FIG. 1 illustrates a message flow between two network devices in accordance with some embodiments. The two network devices may include a user equipment (UE) 104, which may be configured for efeMTC, and an access node 108. These devices may be similar to, and substantially interchangeable with, like-named devices described elsewhere herein.

At 112, the UE 104 may transmit network capability information to the access node 108. In some embodiments, the network capability information may include information related to support of various sub-PRB allocations. For example, the UE 104 may indicate support for 2 out of 3 allocated subcarriers; 3 allocated subcarriers; or 6 allocated subcarriers.

At 116, the access node 108 may transmit a configuration message to the UE 104. The configuration message may configure the UE 104 with information related to various sub-PRB configurations for PUSCH transmissions. The sub-PRB configurations may be a 2 out of 3 subcarrier configuration (e.g., 2 out of 3 subcarriers may be allocated for PUSCH transmission); a 3 subcarrier configuration (e.g., 3 subcarriers may be allocated for PUSCH transmission and all three may be used for the transmission); or a 6 subcarrier configuration (e.g., 6 subcarriers may be allocated for PUSCH transmission and all six may be used for the transmission).

In various embodiments, the configuration information may relate to possible subcarrier allocation, numerology, DMRS design, power control, transport block size (TBS) table design, repetition cycles, etc. In some embodiments, as will be described in further detail, the configuration message may include one or more higher-layer messages such as, but not limited to, radio resource control (RRC) message is that include information elements with the configuration information.

At 120, the access node 108 may transmit an allocation message to the UE 104. The allocation message may provide information related to a specific resource allocation for a PUSCH transmission. For example, the allocation message may indicate a certain number of subcarriers have been allocated for the PUSCH transmission. The indication of the allocation may be in, for example, the downlink control information transmitted in a physical downlink control channel (PDCCH).

At 124, the UE 104 may generate and transmit a PUSCH transmission according to the configuration/allocation information previously received.

Aspects involved in various of these messages will be described in further detail below.

Configuration of 2-Tone Allocation

In some embodiments, a 2-tone allocation may be configured (by, for example, the configuration message at 116). As used herein, "tone" may be used interchangeably with "subcarrier." In some embodiments, a PUSCH with 2 out of 3 subcarriers may be configured together with other sub-PRB allocations, for example, sub-PRB allocations with 3 or 6 subcarriers. The configuration may depend on UE capability (received at, for example, 112). The UE may signal its capability on support of 2 out of 3 subcarriers, 3 subcarriers and 6 subcarriers jointly. For example, one capability message may include all of the UE capabilities related to sub-PRB allocations.

In other embodiments, the capability of support of 2 out of 3 subcarriers may be signaled separately from the support of other sub-PRB allocations, for example, sub-PRB allocations with 3 or 6 subcarriers. The configuration for PUSCH with 2 out of 3 subcarriers can be separate from configuration for PUSCH with 3 and 6 subcarriers.

Numerology

In some embodiments, PUSCH with 2 out of 3 subcarriers may support only 15 kHz subcarrier spacing. Alternatively, 3.75 kHz subcarrier spacing may be supported for PUSCH with 2 out of 3 subcarriers.

Resource Allocation for PUSCH with 2 Out of 3 Subcarriers

Definition of the 3-Subcarrier Allocation

In some embodiments, for PUSCH with 2 out of 3 subcarriers, the 3-subcarrier allocation sets can be non-overlapped, which may be similar to the 3-subcarrier allocation sets in narrowband-Internet of things (NB-IoT). For example, in accordance with one embodiment only four 3-subcarrier allocation sets within a PRB may be allocated for the 2 out of 3 subcarrier allocations. Those four 3-subcarrier allocation sets may include: {0, 1, 2}, {3, 4, 5}, {6, 7, 8} or {9, 10, 11}.

Alternatively, the 3-subcarrier allocation sets can be overlapped. For example, an allocation set can have subcarriers {x, x+1, x+2} for x in {0, 1, . . . , 9} within a PRB. As another example, the allocation of 3-subcarriers can cross PRBs, e.g., the allocation can have subcarriers {x, x+1, x+2} for x in {0, 1, . . . , 69} within a narrowband (NB).

Indication Techniques

The allocation of the 3 subcarriers can be static (e.g., fixed in a 3GPP Technical Specification (TS)), semi-static (e.g., configured by RRC signaling either cell-specifically or UE-specifically), or dynamic (e.g., signaled by DCI).

For the allocation of the 2 subcarriers out of allocated 3 subcarriers, it can be static (e.g., fixed in TS), semi-static (e.g., configured by RRC signaling either cell-specifically or UE-specifically), or dynamic (e.g., signaled by DCI). In some embodiments, if 3-subcarrier allocation has been specified/signaled, 1 bit can be used to indicate whether the allocated 2 subcarriers are the first 2 subcarriers or last 2 subcarriers in the 3-subcarrier allocation. The 1 bit can be indicated in RRC signaling if semi-static configuration of the 2-subcarrier allocation is adopted, or in DCI if dynamic configuration of the 2-subcarrier allocation is adopted. If the indication is via RRC signaling, it can be either cell-specific or UE specific.

The following are some examples of resource allocation techniques that may be used in various embodiments.

In some embodiments, for cases where the 3-subcarrier allocation sets cannot be overlapped for 2 out of 3-subcarrier allocation, one or more of the following techniques may be used.

For example, M bits can be used in DCI for the indication of 2, 3, and 6-subcarrier allocations. For example, M=4 can be used, where the 3-subcarrier allocation for 2 out of 3-subcarrier PUSCH can be indicated by $3*(I_{SC}-X2)+\{0, 1\}+Y$, the 3-subcarrier PUSCH can be indicated by $3*(I_{SC}-X3)+\{0, 1, 2\}$, and the 6-subcarrier allocation can be indicated by $6*(I_{SC}-X6)+\{0, 1, 2, 3, 4, 5\}$, with {X2=0, X3=4, X6=8} and Y from {0, 1}, which can be fixed in a TS, configured by RRC signaling, or indicated by DCI (e.g., via 1 bit), as illustrated in Table 1.

TABLE 1

| Subcarrier indication field ($I_{sc}$) | Set of Allocated subcarriers ($n_{sc}$) |
| --- | --- |
| 0-3 | $3I_{sc} + \{Y, Y + 1\}$ |
| 4-7 | $3(I_{sc} - 4) + \{0, 1, 2\}$ |
| 8-9 | $6(I_{sc} - 8) + \{0, 1, 2, 3, 4, 5\}$ |
| 10-15 | Reserved, or PRB 0, 1, 2, 3, 4 or 6 within the NB |

Table 1 illustrates an example of allocated subcarriers for PUSCH sub-PRB allocation in accordance with some embodiments. The $I_{sc}$ is the subcarrier indication in DCI, and Y may either be 0 or 1, which may be fixed in a TS, configured by RRC signaling, or indicated by DCI (e.g., via 1 bit). For example, consider $I_{sc}$ is signaled as 3 and Y is set at 0, then the set of allocated subcarriers, $n_{sc}$, may be 9 or 10.

As another example of these embodiments, the use of 2 or 3 tones within allocated 3 subcarriers can be configured by RRC signaling or via 1-bit in DCI, and 3 bits can be used for allocation of 3 or 6 subcarriers, as illustrated in Table 2. The two unused states in this example can be reserved, or be used for 1-PRB allocation. In other words, when the subcarrier indication field indicates 0-3, RRC signaling or 1 bit in DCI can be used to indicate whether all the allocated 3 subcarriers are used for PUSCH transmission, or only 2 out of the allocated 3 subcarriers are used for PUSCH transmission.

TABLE 2

| Subcarrier indication field ($I_{sc}$) | Set of Allocated subcarriers ($n_{sc}$) |
| --- | --- |
| 0-3 | $3I_{sc} + \{0, 1, 2\}$ |
| 4-5 | $6(I_{sc} - 4) + \{0, 1, 2, 3, 4, 5\}$ |
| 6-7 | Reserved, or PRB from set X |

Table 2 illustrates an example of allocated subcarriers for PUSCH sub-PRB allocation in accordance with some embodiments. The $I_{sc}$ is the subcarrier indication in DCI, and set X can be any subset of $\{0, 1, 2, 3, 4, 5\}$ with cardinality no more than 2. For example, if $I_{SC}=0$, then the DCI indicates subcarriers $\{0, 1, 2\}$ as the 3 subcarriers to be allocated.

In other embodiments, for cases where the 3-subcarrier allocation sets can be overlapped for 2 out of 3 subcarrier allocation, the 2 subcarriers can be signaled by RRC signaling or DCI directly (e.g., without indication of allocated 3 subcarriers first). In these embodiments, the allocation of 3 subcarriers may be implicit, for example, once the 2 subcarriers are allocated, the 3 subcarriers may be the one which includes the 2 subcarriers. For example, if subcarriers $\{4, 5\}$ are allocated for the PUSCH transmission, the allocated 3 subcarriers can be $\{3, 4, 5\}$ or $\{4, 5, 6\}$ depending on definition of 3 subcarriers.

As one example of these embodiments, the 2-subcarrier allocation can be non-overlapped within 1 PRB, for example, the allocation can be subcarriers $\{0, 1\}, \{2, 3\}, \{4, 5\}, \{6, 7\}, \{8, 9\}$ or $\{10, 11\}$. Various embodiments may be used for indication of allocation with 2, 3 and 6 subcarriers. For example, 4 bits can be used for the indication of allocated subcarriers, where 2-tone allocations can use $2*(I_{SC}-X2)+\{0, 1\}$, 3-tone allocations can use $3*(I_{SC}-X3)+\{0, 1, 2\}$, and 6-tone allocation can use $6*(I_{SC}-X6)+\{0, 1, 2, 2, 3, 4, 5\}$, with $\{X2=0, X3=6, X6=10\}$, and $I_{SC}$ from 0 to 5, from 6 to 9 and from 10 to 11 for 2-tone, 3-tone and 6-tone allocations, respectively. There may be four unused states, which can be reserved, or used for indication of 1-PRB allocation. Table 3 provides an example of this embodiment.

TABLE 3

| Subcarrier indication field ($I_{sc}$) | Set of Allocated subcarriers ($n_{sc}$) |
| --- | --- |
| 0-5 | $2I_{sc} + \{0, 1\}$ |
| 6-9 | $3(I_{sc} - 6) + \{0, 1, 2\}$ |
| 10-11 | $6(I_{sc} - 10) + \{0, 1, 2, 3, 4, 5\}$ |
| 12-15 | Reserved, or PRB from set X |

Table 3 illustrates another example of allocated subcarriers for sub-PRB PUSCH allocation in accordance with some embodiments. The $I_{sc}$ is the subcarrier indication in DCI, and set X can be any subset of $\{0, 1, 2, 3, 4, 5\}$ with cardinality no more than 4.

In various embodiments, modulation, redundancy version (RV) cycling, resource unit (RU) indication, and frequency hopping (FH) scheme may also be used.

DMRS

Some embodiments may include one or more of the following DMRS designs. The DMRS with length of N can be mapped to 4th symbol in each slot (which has 7 symbols) within duration of N/4 ms, for example for example, N=2, 12 or 16. For DMRS with length of 12 or 16, the DMRS sequences defined in NB-IoT with length of 12 or 16 can be used.

Figure 2:
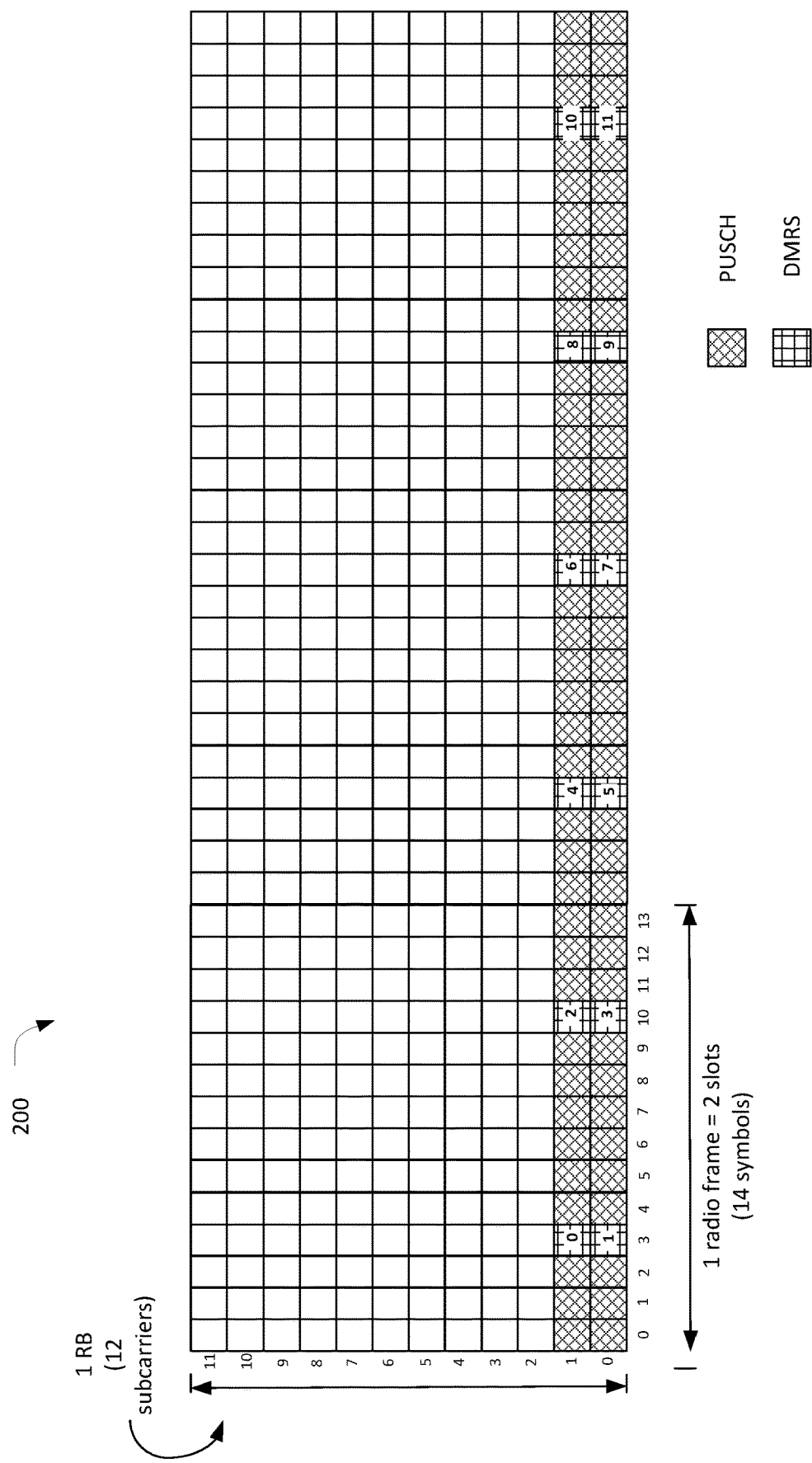
FIG. 2 illustrates a resource grid in accordance with some embodiments.

FIG. 2 illustrates a resource grid 200 with an example of the DMRS mapping with length-12 DMRS in accordance with some embodiments. The number n within the DMRS element indicates the $n^{th}$ element of the DMRS sequence.

The length-12 DMRS may be carried by 12 resource elements distributed throughout a 2-tone PUSCH (shown on subcarriers 0 and 1) in six DMRS symbols over six slots. The DMRS may be mapped in a frequency first manner with the portions of the DMRS mapped sequentially to each subcarrier of a particular symbol before moving on to the next symbol. For example, DMRS_0 (the first element of the DMRS sequence) may be carried by the resource element at symbol 3, subcarrier 1 of the first slot; DMRS_1 may be carried by resource element at symbol 3, subcarrier 0 of the first slot; etc.

Figure 3:
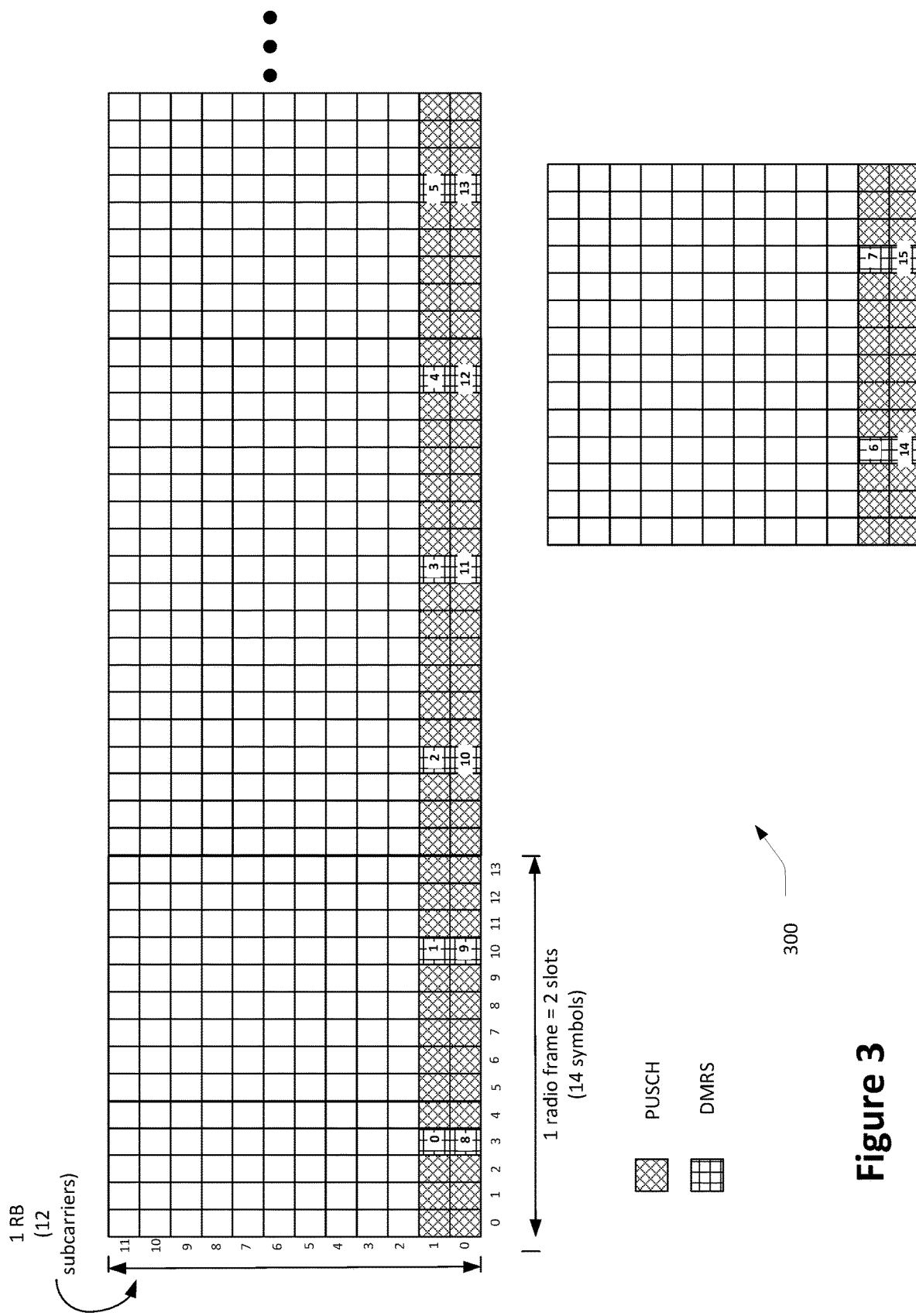
FIG. 3 illustrates a resource grid in accordance with some embodiments.

FIG. 3 illustrates a resource grid 300 with an example of the DMRS mapping with length-16 DMRS in accordance with some embodiments. The number n within the DMRS element indicates the $n^{th}$ element of the DMRS sequence.

The length-16 DMRS may be carried by 16 resource elements distributed throughout a 2-tone PUSCH (shown on subcarriers 0 and 1) in eight DMRS symbols over eight slots. In this embodiment, the DMRS sequence may be mapped in a time first manner with the portions of the DMRS mapped sequentially to the different symbols of a first subcarrier before proceeding to the symbols of the next subcarrier. For example, DMRS_0 may be carried by the resource element at symbol 3, subcarrier 1 of the first slot; DMRS_1 may be carried by resource element at symbol 10, subcarrier 1 of the second slot; etc.

In some embodiments, the length-16 DMRS of FIG. 3 can reuse the DMRS designed in NB-IoT for single-tone NPUSCH, which is an element-wise product of pseudo noise (PN)/Gold-sequence (not physical cell identity (PCID)-dependent) and Hadamard sequence (PCID-dependent). The length-16 DMRS sequence can be used when the resource unit (RU) for PUSCH with 2 out of 3 subcarriers is defined as 4 ms or 8 ms. With RU of 8 ms, the DMRS within the first 4 ms and last 4 ms would be the same.

Figure 4:
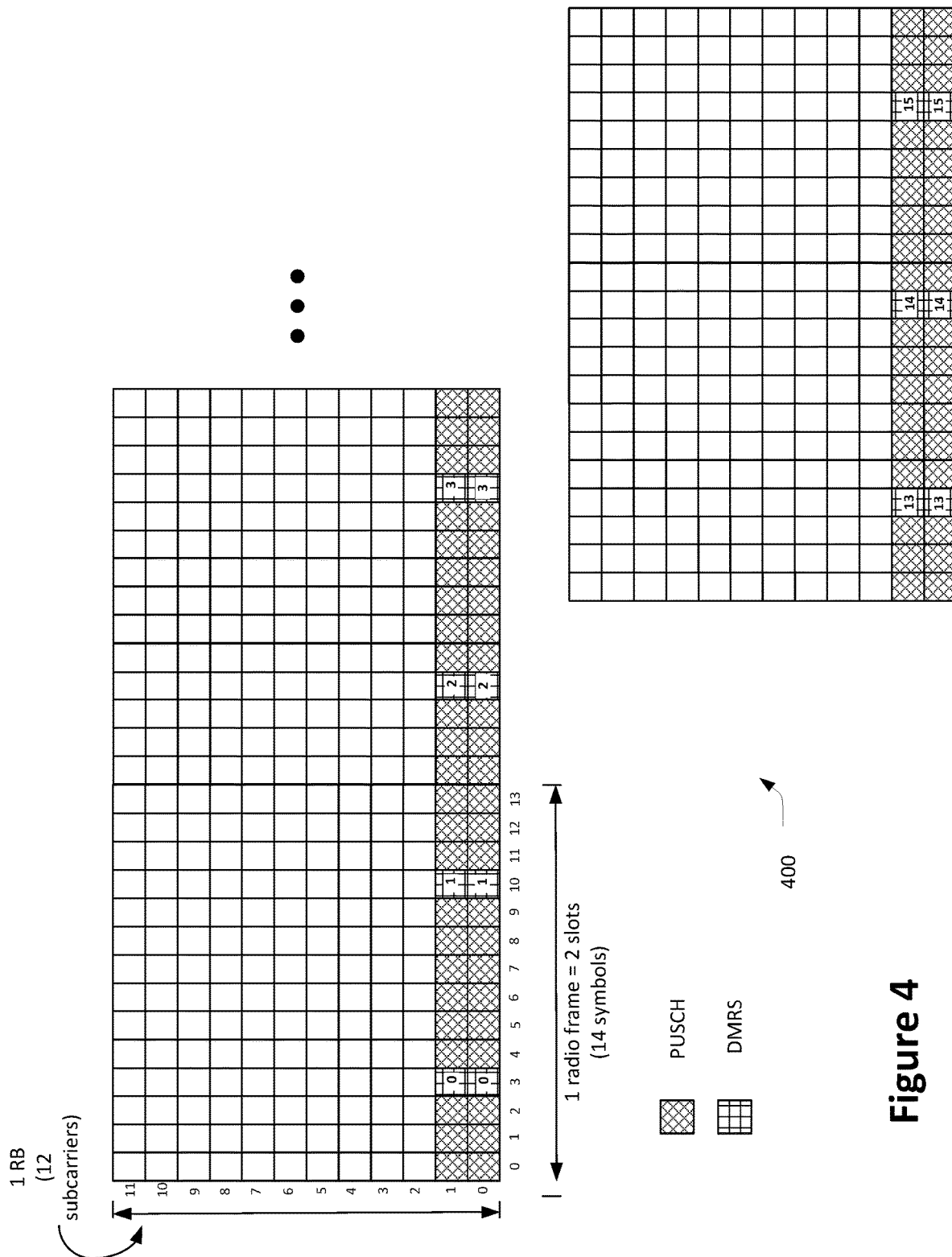
FIG. 4 illustrates a resource grid in accordance with some embodiments.

FIG. 4 illustrates a resource grid 400 with an example of a DMRS mapping with two length-16 DMRS in accordance with some embodiments. The number n within the DMRS element indicates the $n^{th}$ element of the DMRS sequence.

In this embodiment two length-16 DMRS sequences may be mapped to the two subcarriers allocated for PUSCH transmission. In this embodiment, a first DMRS sequence may be mapped to eight symbols of a first subcarrier (for example, subcarriers 1); while a second DMRS sequence may be mapped to the same eight symbols of a second subcarrier (for example, subcarrier 0).

In some embodiments, $r_u(n)$ as defined in 3GPP TS 36.211 v15.0.0 (2018-01), Section 10.1.4.1.1 may be used as a DMRS sequence mapped to a first tone, where u depends on a cell ID as in Rel-13 NB-IoT. In one example, the same DMRS sequence may be mapped to the second tone. Alternatively, another sequence, for example, $r_x(n)$, may be used in mapped to the second subcarrier across the 16 DMRS symbols. The parameter x can be determined based on a predefined mapping from u, e.g., x=(u+m) mod 16, where m can be an integer such as 1, 2, 4 or 8. The first example above with the same sequence applied to two tones would be a special case of this alternative when m=0.

In some embodiments, there may be a fixed offset from a sequence index used for the first tone to a sequence index used for the other tone. For example, the parameter m can be specified in a TS or configured by the eNB (e.g., via RRC signaling). As another example, m can depend on cell ID, e.g., m=cell ID mod N, where N is the number of possible values for m.

In yet another example, the sequence index used for the other tone can be selected randomly according to a predefined sequence s(k) from 0 to 15 (e.g., s(k)=k where k=0, 1, . . . , 15). The sequence index can be x=(u+s(m)) mod 16, where m can be the starting subframe (SF)/slot index of the PUSCH transmission, or the starting/slot index of the first DMRS symbol among the 16 symbols, or the starting/slot index+cell ID, or any other function of the starting/slot index and/or cell ID.

Alternatively, we can have x=(u+s(m)) mod 16, where s(m) is a function of a random sequence, which may depend on the starting/slot index of the first DMRS symbol among 16 DMRS symbols, starting/slot index of PUSCH transmission, and/or cell ID. For example, s(m)=ƒ(c(m)), where ƒ(x) is the binary-to-decimal function with x being a binary sequence, and c(m) can be a length-31 gold sequence which can be generated according to Section 7.2 in 3GPP TS 36.211, with c_init being a predefined parameter (which can be specified in the TS or configured by an access node (e.g., an eNB) via, e.g., system information) or being a function of starting/slot index of the first DMRS symbol among 16 DMRS symbols, starting/slot index of PUSCH transmission, and/or cell ID. In one example, N elements out of the gold sequence can be used (e.g., c(0), c(1), . . . , c(N−1)) as a binary sequence input for function ƒ( ), where N is a positive integer such as 4 or 8. The initialization of the binary sequence c_init can be:

$$c_{init}=(\lfloor n_s/2 \rfloor+1)\cdot(2n_{ID}^{cell}+1)\cdot 2^{16}+n_{SCID},$$

where $n_s$ can be the starting slot index of first DMRS symbol among 16 DMRS symbols or the starting slot index of PUSCH transmission, $n_{ID}^{cell}$ is the cell ID, and the value of $n_{SCID}$ can be zero or be indicated by an access node (e.g., eNB) (e.g., via RRC signaling or DCI). With N=4 and c_init in the above example, we can generate a binary sequence c(0), c(1), c(2) and c(3) depending on the cell ID and scheduling time of PUSCH, and the sequence index for the second subcarrier can be x=(u+bin2dec(c(0)c(1)c(2)c(3))) mod 16.

Alternatively, c_init can be a function of cell ID only, e.g., c_init=cell ID, or $c_{init}=(2n_{ID}^{cell}+1)\cdot 2^{16}$, and m can be a function that depends on the starting slot index of first DMRS symbol among 16 DMRS symbols or the starting slot index of PUSCH transmission. For example, m can be a sequence of t, t+1, . . . , t+N−1, where t is a starting slot index of first DMRS symbol among 16 DMRS symbols or the starting slot index of PUSCH transmission, and in this case the binary sequence input for function ƒ( ) is c(t), c(t+1), . . . , c(t+N−1).

When group hopping is enabled, m can be the same as the case when group hopping is not enabled, or alternatively m can be a function of group hopping pattern and/or sequence-shift pattern as u, e.g., m=(fgh(ns)+fss) mod N, where N is the number of possible values for m.

As another alternative, a length-8 DMRS may be defined. The sequence can be an element-wise product of PN/Gold-sequence (not PCID-dependent) and length-8 Hadamard sequence (PCID-dependent). For example, the reference signal sequence can be:

$$\bar{r}_u(n) = \frac{1}{\sqrt{2}}(1+j)(1-2c(n))w(n \bmod 8),$$

$$0 \le n < M_{rep}^{NPUSCH} N_{slots}^{UL} N_{RU},$$

where c(n) is defined in Section 7.2 of 3GPP TS 36.211. The value of w(n) can be defined as shown by table 4.

TABLE 4

| | Definition of w(n) | | | | | | | |
|---|---|---|---|---|---|---|---|---|
| u | w(0), . . . , w(7) | | | | | | | |
| 0 | 1 | 1 | 1 | 1 | 1 | 1 | 1 | 1 |
| 1 | 1 | −1 | 1 | −1 | 1 | −1 | 1 | −1 |
| 2 | 1 | 1 | −1 | −1 | 1 | 1 | −1 | −1 |
| 3 | 1 | −1 | −1 | 1 | 1 | −1 | −1 | 1 |
| 4 | 1 | 1 | 1 | 1 | −1 | −1 | −1 | −1 |
| 5 | 1 | −1 | 1 | −1 | −1 | 1 | −1 | 1 |
| 6 | 1 | 1 | −1 | −1 | −1 | −1 | 1 | 1 |
| 7 | 1 | −1 | −1 | 1 | −1 | 1 | 1 | −1 |

In some embodiments, the parameter u=cell ID mod 8 if group hopping is not enabled, and u depends on group hopping pattern and sequence-shift pattern as defined in 10.1.4.1.3 in 3GPP TS 36.211 if group hopping is enabled. The mapping of the length-8 DMRS sequences can be similar as the methods disclosed above for length-16 DMRS. For example, the length-8 DMRS sequence, e.g., $r_u(n)$ as defined above, can be mapped to first tone across 8 DMRS symbols. For the second tone below the first tone which is also allocated for PUSCH, in one embodiment, the same sequence $r_u(n)$ can be used, e.g., the sequence is mapped across 8 symbols and repeated in frequency domain. Alternatively, another length-8 sequence $r_x(n)$ can be used, mapping on the other tone allocated for PUSCH across 8 DMRS symbols, where x can be a function of u, e.g., x=(u+n) mod 8 with n being an integer such as 1, 2 or 4, or x=(u+cell ID) mod 8. In other examples, the mapping options between x and u discussed in embodiment with length-16 DMRS sequence can be applied to this embodiment as well.

Note that for the above embodiments with 2-tone BPSK DMRS symbols, after DFT precoding, it would be transmitted on one out of these two subcarriers, and thus the peak-to-average-power-ratio (PAPR) can be the same as single-tone transmission.

Figure 5:
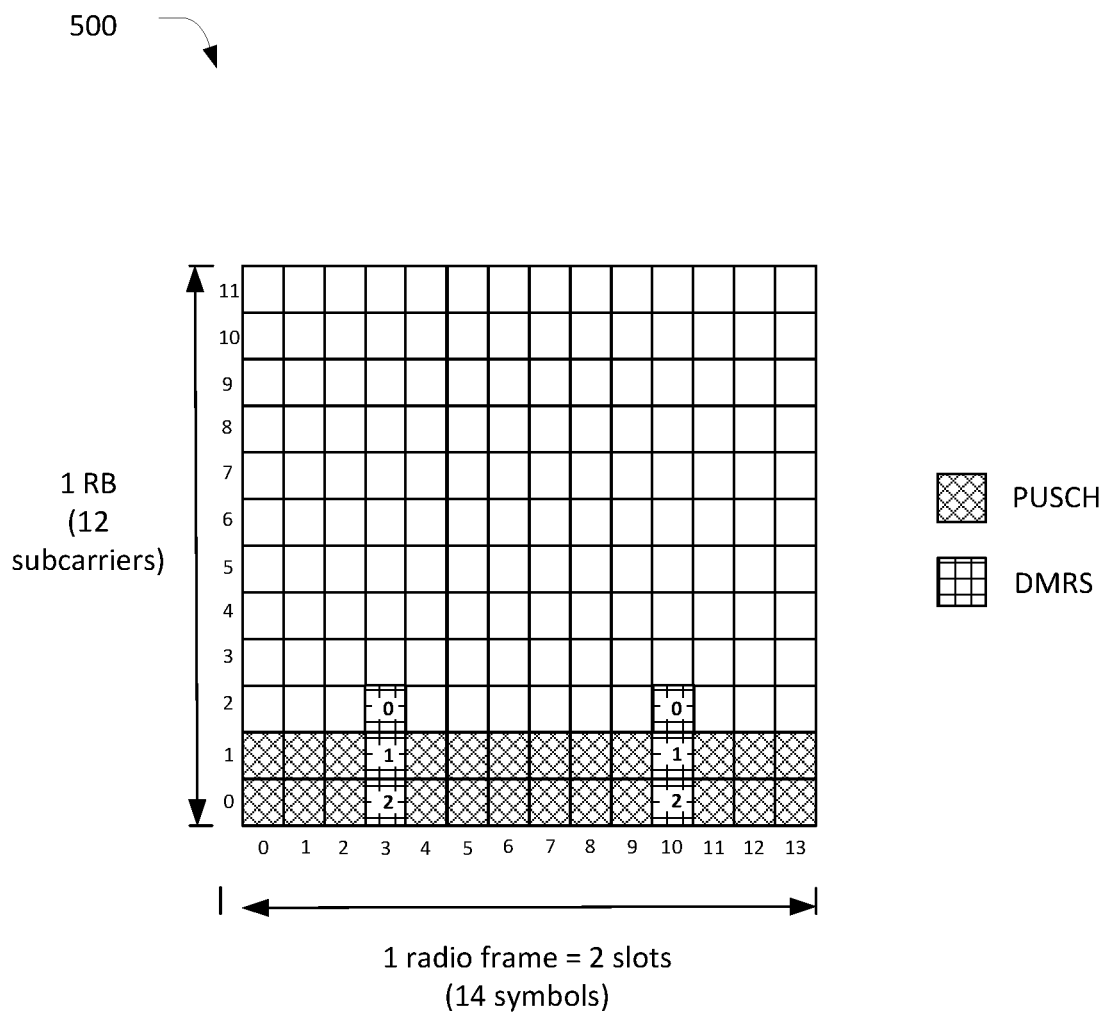
FIG. 5 illustrates a resource grid in accordance with some embodiments.

In another embodiment, a length-3 DMRS sequence (following NB-IoT design) can be used, where the UE transmits DMRS on the allocated 3 subcarriers while PUSCH is sent on 2 out of 3 allocated subcarriers. This can be applied when the 3-subcarrier allocation sets are not overlapped for different UEs in the cell. FIG. 4 provides an example of length-3 DMRS mapping. FIG. 5 illustrates a resource grid 500 with an example DMRS mapping with length-3 DMRS sequence in accordance with some embodiments. The number n within the DMRS element indicates the $n^{th}$ element of the DMRS sequence.

Figure 6:
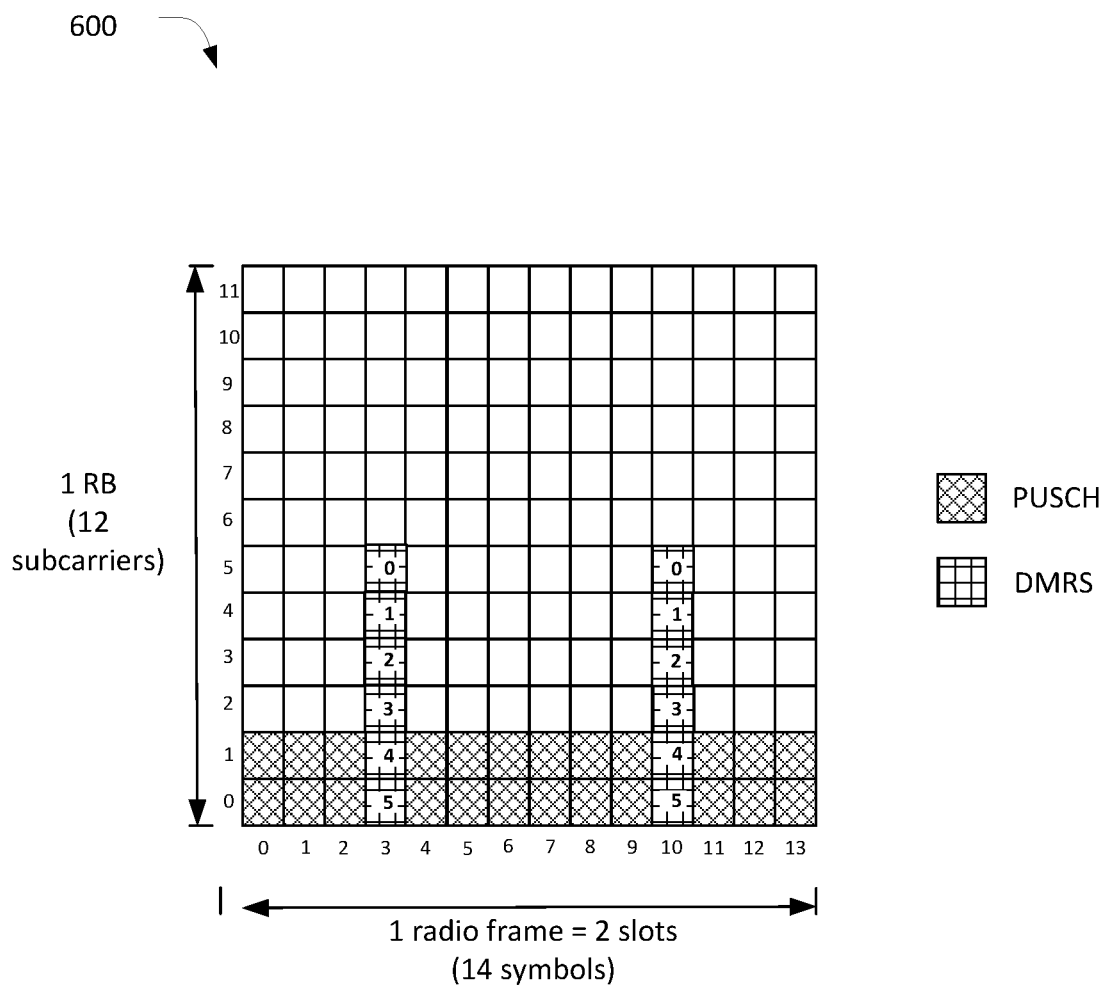
FIG. 6 illustrates a resource grid in accordance with some embodiments.

As another example, length-6 DMRS sequence (following NB-IoT design) can be used, where the UE transmits DMRS on the 6 subcarriers which include the 2 subcarriers with actual PUSCH transmission. The 6 subcarriers may be non-overlapped as defined in NB-IoT. The cyclic shifts and base sequence index can be changed to be UE specific, and be indicated by the DCI. For example, 1 or 2 bits can be used to indicate the cyclic shift and/or base sequence index. As another example, the cyclic shifts or base sequence index can be based on UE ID, e.g., (UE ID mod number of supported cyclic shifts and/or base sequences). Alternatively, the cyclic shift or base sequence can be indicated by RRC signaling. By making the cyclic shift and/or base sequence index UE specific, the DMRS for UEs whose 2 subcarriers for PUSCH transmission belong to the same set of 6 subcarriers can be multiplexed. FIG. 6 illustrates a resource grid 600 with an example of length-6 DMRS mapping in accordance with some embodiments. The number n within the DMRS element indicates the $n^{th}$ element of the DMRS sequence.

TBS Table Design

In some embodiments, a Rel-13 eMTC PUSCH TBS table can be used as the design baseline for sub-PRB PUSCH. For coverage enhancement (CE) mode A, the number of PRBs can be replaced by number of RUs for sub-PRB design. On the other hand, for CE mode B, some columns corresponding to certain number of PRBs can be selected to determine the TBS values. Table 5 below shows the Rel-13 eMTC TBS table with $I_{TBS} \leq 10$.

TABLE 5

| $I_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | |

Recall that in Rel-13 eMTC CE mode B, the TBS with allocated number of PRBs being 1 is determined by the column associated to 3 PRBs, while the TBS with allocated number of PRBs being 2 is determined by the column associated to 6 PRBs. Similarly for sub-PRB allocation, in one example, when the number of RUs allocated for PUSCH in CE mode B is 1 and 2, the TBS can be determined by the columns associated to 3 and 6 PRBs in Table 5, respectively. Alternatively, the TBS for allocated number of RUs being N1 and N2 in CE mode B can be determined by the columns associated to 3 and 6 PRBs in Table 5, respectively, where N1 and N2 are integers (e.g., N1=2 and N2=4).

In various embodiments, either the first example or second example may be used for all sub-PRB allocations. Alternatively, the first example may only apply to 3-tone and 6-tone PUSCH, while for 2-tone PUSCH, the second example with N1=2 and N2=4 may be used.

Power Control

In some embodiments, the power control mechanism for sub-PRB PUSCH in efeMTC can follow NB-IoT NPUSCH power control mechanism.

Specifically, if a number of repetitions of allocated RUs for sub-PRB PUSCH is larger than 2, UE may use max configured transmit power $P_{CMAX,c}(i)$; otherwise, the following power control scheme may be used:

$$P_{PUSCH,c}(i) = \min \left\{ \begin{array}{l} P_{CMAX,c}(i) \\ 10\log_{10}(M_{PUSCH,c}(i)) + P_{O\_PUSCH,c}(j) + \alpha_c(j) \cdot PL_c \end{array} \right\} [dBm],$$

where, $P_{CMAX,c}(i)$ is the configured UE transmit power defined in 3GPP TS 36.101 v15.1.0 (2018-01) in uplink (UL) slot i for serving cell c, and $M_{PUSCH,c}(i)$ is from set X and reflects a number of subcarriers the actual sub-PRB PUSCH transmission occupied.

In some embodiments, X={2, 3, 6, 12}, where 2 may be used when 2 out of 3 subcarriers are allocated for sub-PRB PUSCH transmission. In this embodiment, if 1 PRB is allocated when UE is configured with sub-PRB PUSCH transmission, power control may still use this technique and $M_{PUSCH,c}(i)=12$, while >1 PRB allocation follows pre-release eMTC UL power control.

Alternatively, X={2, 3, 6}, where 2 may be used when 2 out of 3 subcarriers are allocated for sub-PRB PUSCH transmission. When PUSCH resource allocation is >=1 PRB, power control follows pre-release eMTC UL power control.

$P_{O\_PUSCH,c}(j)$ is a parameter composed of the sum of a component $P_{O\_NOMINAL\_PUSCH,c}(j)$ provided from higher layers and a component $P_{O\_UE\_PUSCH,c}(j)$ provided by higher layers for j=1 and for serving cell c where j∈{1, 2}. In some embodiments, these parameters can be different from the parameters used in power control mechanism for PUSCH with resource allocation granularity of 1 PRB.

For PUSCH (re)transmissions corresponding to a dynamic scheduled grant then j=1 and for PUSCH (re) transmissions corresponding to the random access response grant (if sub-PRB PUSCH is supported for this PUSCH) then j=2.

In some embodiments, $P_{O\_UE\_PUSCH,c}(2)=0$ and $P_{O\_NOMINAL\_PUSCH,c}(2)=P_{O\_PRE}+\Delta_{PREAMBLE\_Msg3}$, where the parameter preambleInitialReceivedTargetPower [36.321]($P_{O\_PRE}$) and $\Delta_{PREAMBLE\_Msg3}$ are signalled from higher layers for serving cell c.

For j=1, $\alpha_c(j)$ is provided by higher layers for serving cell c. For j=2, $\alpha_c(j)=1$.

$PL_c$ is a downlink path loss estimate calculated in the UE for serving cell c in dB and $PL_c$=referenceSignalPower–higher layer filtered RSRP, where referenceSignalPower is provided by higher layers and RSRP is defined in 3GPP TS 36.214 v15.0.1 (2018-01) for serving cell c and the higher layer filter configuration is defined in 3GPP TS 36.331 v15.0.1 (2018-01) for serving cell c.

Repetition Cycles

In some embodiments, the repetition cycles can be as follows.

In each cycle of one redundancy version (RV), each subframe (or NB-slot if introduced to support a smaller subcarrier spacing) in the allocated resources may be repeated consecutively for Z times.

In some embodiments, Z min{M, repetition/N}, where M and N may be an integer number e.g., M=4, N=2 or N=4. This can be applied to all sub-PRB allocation, or certain multi-tone sub-PRB allocation (e.g., 3-subcarrier and 6-subcarrier PUSCH). In some examples, M and N can have different values for FDD and TDD, e.g., M=4 for FDD and M=5 for TDD.

In some embodiments, Z=1. This can be applied to all sub-PRB allocation, or only certain sub-PRB allocations (e.g., PUSCH with 2 out of 3 allocated subcarriers). Alternatively, this can be applied to all sub-PRB allocation in CE mode A.

To better align with FH interval, the same subframe can be repeated within a block of $N_{acc}$ subframes, where the first subframe in each block of $N_{acc}$ consecutive subframes, denoted as n satisfies (n mod Nacc)=0. The $N_{acc}$ equals Z in above embodiments. In other words, the start of repetition cycle may be based on absolute system frame number (SFN).

Impact on TDD Systems

In some embodiments, the support of sub-PRB allocation in TDD systems may depend on the number of subcarriers for the sub-PRB allocations and/or the TDD configurations.

In some embodiments, 2-subcarrier PUSCH can be supported only in certain TDD configurations. For example, if RU length is 4 or 8 ms for 2-subcarrier PUSCH, only TDD configurations 1, 2, 4, 5 and/or 6 support 2-subcarrier PUSCH. Alternatively, if RU length is 3 or 6 ms for 2-subcarrier PUSCH, only TDD configurations 0, 3 and/or 6 support 2-subcarrier PUSCH. For RU length of 6 ms, TDD configurations 2 and/or 4 can also support 2-subcarrier PUSCH.

In other embodiments, 2-subcarrier PUSCH can be supported in all TDD configurations.

Figure 7:
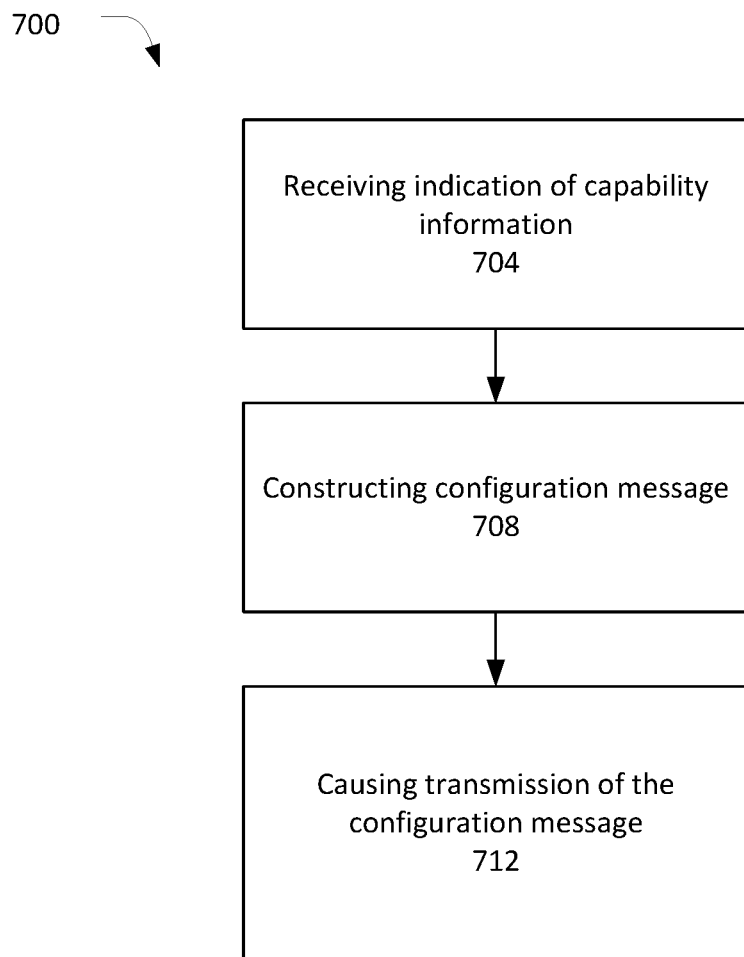
FIG. 7 illustrates an operation flow/algorithmic structure in accordance with some embodiments.

FIG. 7 illustrates an operation flow/algorithmic structure 700 in accordance with some embodiments. In some embodiments, the operation flow/algorithmic structure 700 may be performed or implemented by an access node or components thereof (for example, baseband circuitry) as described herein.

The operation flow/algorithmic structure 700 may include, at 704, receiving an indication of capability information. The capability information may be related to a UE's ability to support or otherwise utilize sub-PRB PUSCH allocations. In some embodiments, the capability information may indicate support for 2 out of 3 allocated subcarriers; 3 subcarriers; or 6 subcarriers.

The operation flow/algorithmic structure 700 may further include, at 708, constructing a configuration message. The configuration message may be based on the capability information and may configure the UE with various parameters that may relate to utilizing sub-PRB PUSCH allocations. For example, the configuration message may include configuration information that is related to a numerology, resource allocation, DMRS design, power control, TDD scheme, etc. It may be understood that these parameters may be transmitted to the UE in a number of configuration message is sent over time.

The operation flow/algorithmic structure 700 may further include, at 712, causing transmission of the configuration message.

Figure 8:
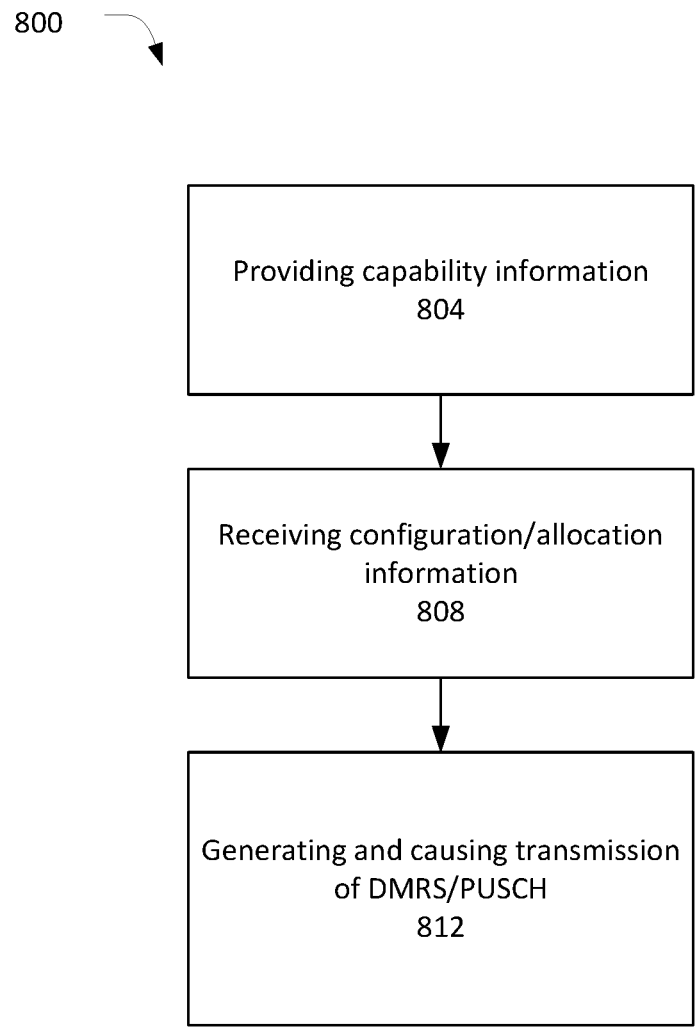
FIG. 8 illustrates an operation flow/algorithmic structure in accordance with some embodiments.

FIG. 8 illustrates an operation flow/algorithmic structure 800 in accordance with some embodiments. The operation flow/algorithmic structure 800 may be performed or implemented by a UE or components thereof (for example, baseband circuitry) as described herein.

The operation flow/algorithmic structure 800 may include, at 804, providing capability information. In some embodiments, the capability information may be related to support or use of sub-PRB PUSCH allocations. The capability information may be provided to the access node in one or more messages.

The operation flow/algorithmic structure 800 may further include, at 808, receiving configuration/allocation information. The configuration/allocation information may provide various information related to the use of sub-PRB PUSCH allocations. In some embodiments, the configuration information may be received initially to configure the UE. Subsequently, allocation information may be provided to the UE to indicate a specific allocation of resources.

The operation flow/algorithmic structure 800 may further include, at 812, generating and causing transmission of DMRS/PUSCH. The DMRS/PUSCH may be transmitted in the sub-PRB allocation as described herein.

Figure 9:
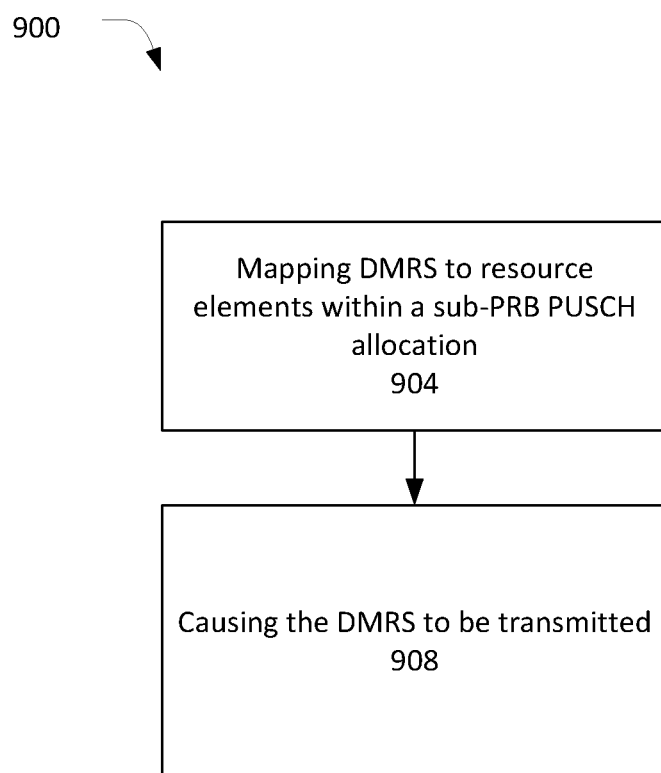
FIG. 9 illustrates an operation flow/algorithmic structure in accordance with some embodiments.

FIG. 9 illustrates an operation flow/algorithmic structure 900 in accordance with some embodiments. The operation flow/algorithmic structure 900 may be performed or implemented by a UE or components thereof (for example, baseband circuitry) as described herein.

The operation flow/algorithmic structure 900 may include, at 904, mapping a DMRS to resource elements within a sub-PRB PUSCH allocation. In some embodiments, elements of a DMRS sequence may be mapped in a frequency first manner with portions of the DMRS sequence mapped sequentially to each subcarrier of a particular symbol before moving on to the next symbol. Alternatively, the DMRS sequence may be mapped in a time first manner with the portions of the DMRS sequence mapped sequentially to the different symbols of a first subcarrier before proceeding to the symbols of the next subcarrier. In some embodiments, one or more DMRS sequences may be mapped to the resource elements for transmission.

The operation flow/algorithmic structure 900 may further include, at 908, causing the DMRS to be transmitted.

Figure 10:
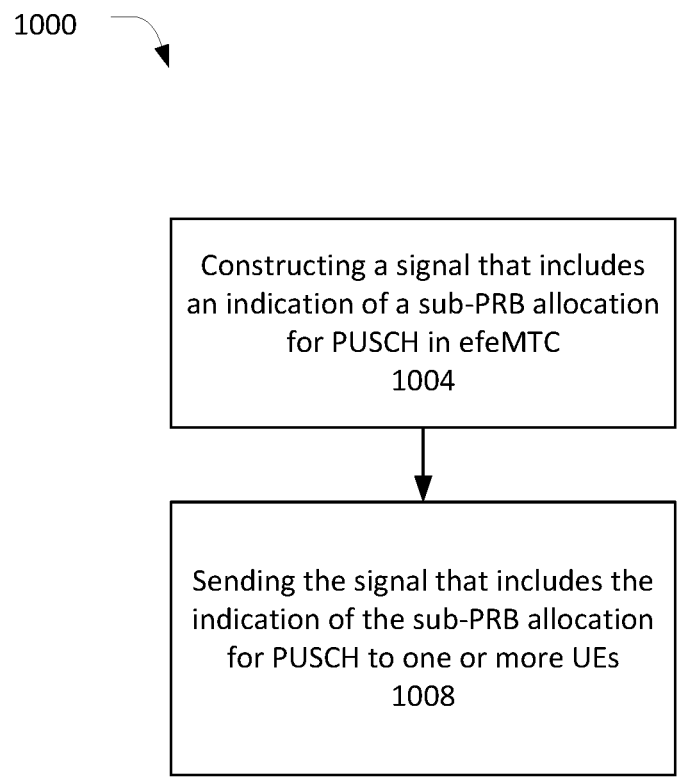
FIG. 10 illustrates a process in accordance with some embodiments.

FIG. 10 illustrates a process in accordance with some embodiments. The process 1000 may be performed by an electronic device(s), network(s), system(s), chip(s) or component(s), or portions or implementations thereof, as described herein. The process 1000 may include, at 1004, constructing or causing to construct a signal that includes an indication of a sub-PRB allocation for PUSCH in efeMTC. The process 1000 may further include, at 1008, sending or causing to send the signal that includes the indication of the sub-PRB allocation for PUSCH to one or more UEs.

Figure 11:
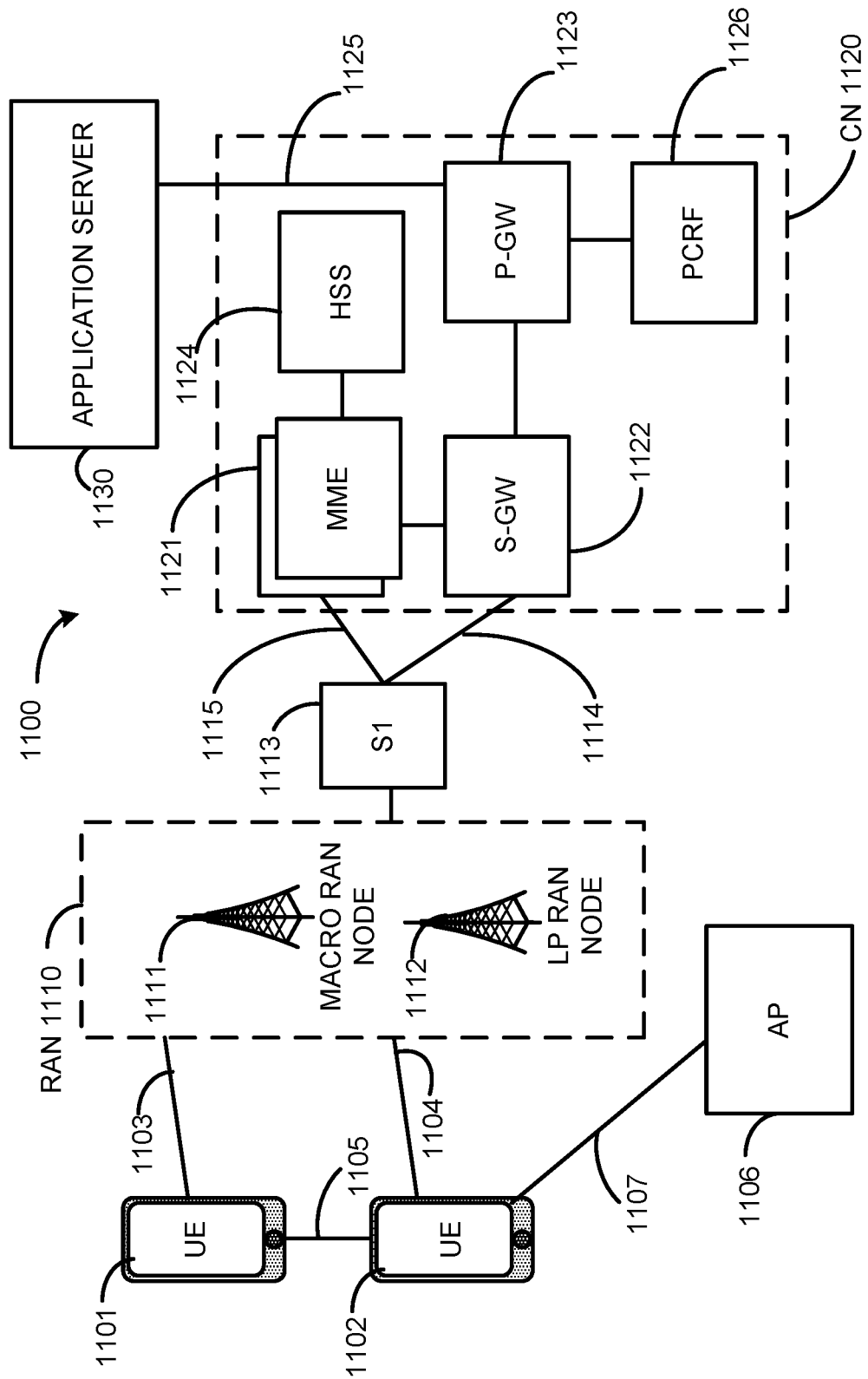
FIG. 11 illustrates an architecture of a system of a network in accordance with some embodiments.

FIG. 11 illustrates an architecture of a system 1100 of a network in accordance with some embodiments. The system 1100 is shown to include a user equipment (UE) 1101 and a UE 1102, either of which may be similar to and substantially interchangeable with UE 104. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 1101 and 1102 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 1101 and 1102 can be configured for efeMTC communication and may, in some instances, comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110. The RAN 1110 may be, for example, an Evolved Universal Mobile Telecommunications System (UMTS) Terrestrial Radio Access Network (EUTRAN), a NextGen RAN (NG RAN), or some other type of RAN. The UEs 1101 and 1102 utilize connections (or channels) 1103 and 1104, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 1105 may be used in vehicular applications and communications technologies, which are often referred to as V2X systems. V2X is a mode of communication where UEs (for example, UEs 1101, 1102) communicate with each other directly over the PC5/SL interface 1105 and can take place when the UEs 1101, 1102 are served by RAN nodes 1111, 1112 or when one or more UEs are outside a coverage area of the RAN 1110. V2X may be classified into four different types: vehicle-to-vehicle (V2V), vehicle to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 1101, 1102, RAN nodes 1111, 1112, application servers 1130, and pedestrian UEs 1101, 1102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 1101, 1102 may be implemented/employed as Vehicle Embedded Communications Systems (VECS) or vUEs.

The UE 1102 is shown to be configured to access an access point (AP) 1106 (also referred to as "WLAN node 1106", "WLAN 1106", "WLAN Termination 1106" or "WT 1106" or the like) via connection 1107. The connection 1107 can comprise a local wireless connection, such as a connection consistent with any IEEE 802.11 protocol, wherein the AP 1106 would comprise a wireless fidelity (WiFi®) router. In this example, the AP 1106 is shown to be connected to the Internet without connecting to the core network of the wireless system (described in further detail below). In various embodiments, the UE 1102, RAN 1110, and AP 1106 may be configured to utilize LTE-WLAN aggregation (LWA) operation and/or WLAN LTE/WLAN Radio Level Integration with IPsec Tunnel (LWIP) operation. The LWA operation may involve the UE 1102 in RRC_CONNECTED being configured by a RAN node 1111, 1112 to utilize radio resources of LTE and WLAN. LWIP operation may involve the UE 1102 using WLAN radio resources (e.g., connection 1107) via Internet Protocol Security (IPsec) protocol tunneling to authenticate and encrypt packets (e.g., internet protocol (IP) packets) sent over the connection 1107. IPsec tunneling may include encapsulating entirety of original IP packets and adding a new packet header, thereby protecting the original header of the IP packets.

The RAN 1110 can include one or more access nodes, e.g., RAN nodes 1111, 1112, that enable the connections 1103 and 1104. The RAN nodes 1111, 1112 may be similar to and substantially interchangeable with access node 108. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 1102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120 via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 comprises the MMEs 1121, the S-GW 1122, the Packet Data Network (PDN) Gateway (P-GW) 1123, and a home subscriber server (HSS) 1124. The MMEs 1121 may be similar in function to the control plane of legacy Serving General Packet Radio Service (GPRS) Support Nodes (SGSN). The MMEs 1121 may manage mobility aspects in access such as gateway selection and tracking area list management. The HSS 1124 may comprise a database for network users, including subscription-related information to support the network entities' handling of communication sessions. The CN 1120 may comprise one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1120 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Rules Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
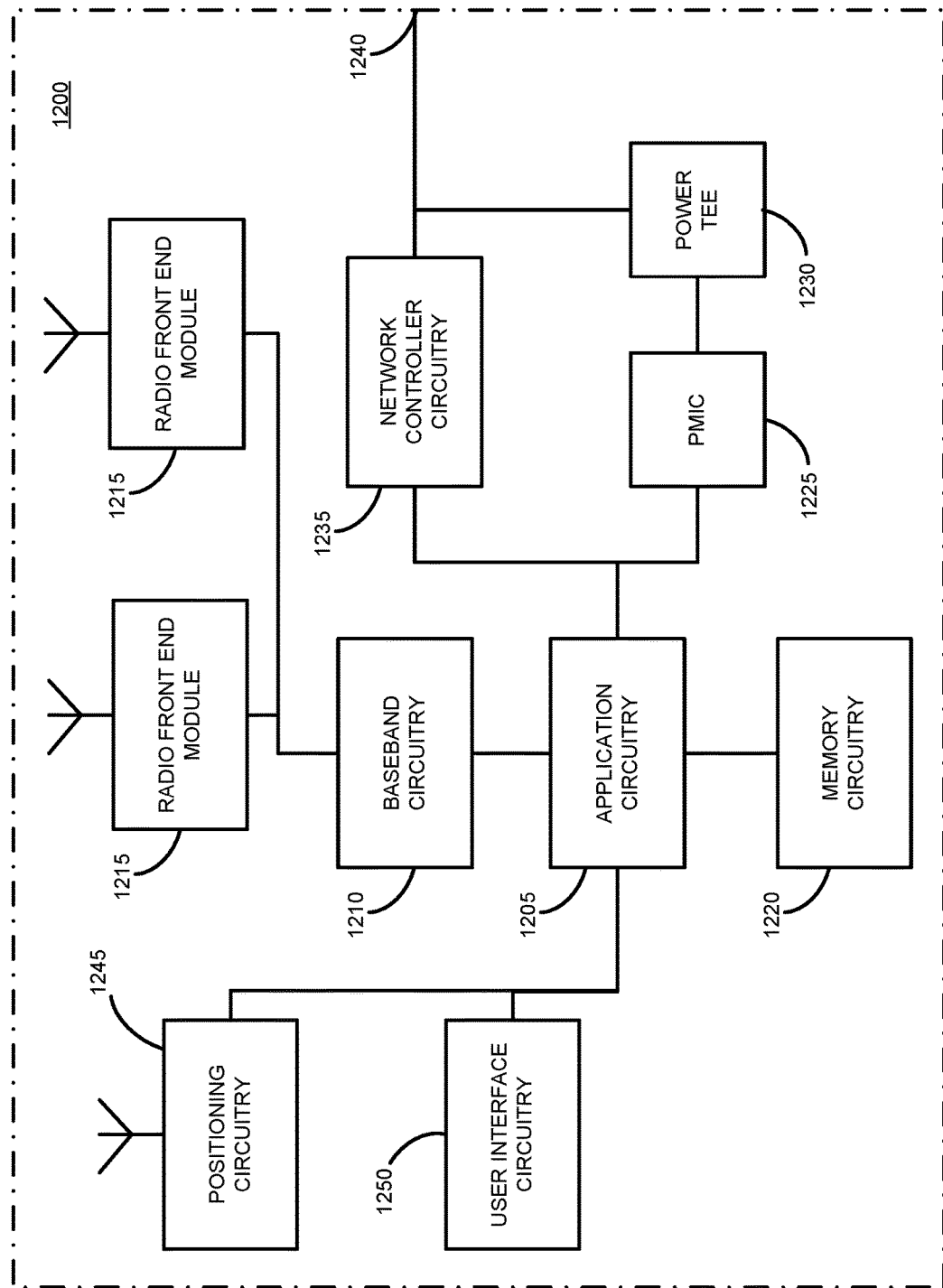
FIG. 12 illustrates an example of an infrastructure equipment in accordance with various embodiments.

FIG. 12 illustrates an example of infrastructure equipment 1200 in accordance with various embodiments. The infrastructure equipment 1200 (or "system 1200") may be implemented as a base station, radio head, RAN node, etc., such as the RAN nodes 1111 and 1112, and/or AP 1106 shown and described previously. In other examples, the system 1200 could be implemented in or by a UE, application server(s) 1130, and/or any other element/device discussed herein. The system 1200 may include one or more of application circuitry 1205, baseband circuitry 1210, one or more radio front end modules 1215, memory 1220, power management integrated circuitry (PMIC) 1225, power tee circuitry 1230, network controller 1235, network interface connector 1240, satellite positioning circuitry 1245, and user interface 1250. In some embodiments, the device 1300 may include additional elements such as, for example, memory/storage, display, camera, sensor, or input/output (110) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 1120 may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 1205 may include one or more central processing unit (CPU) cores and one or more of cache memory, low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 1205 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 1200 may not utilize application circuitry 1205, and instead may include a special-purpose processor/controller to process IP data received from an EPC or 5GC, for example.

Additionally or alternatively, application circuitry 1205 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1205 may comprise logic blocks or logic fabric including other interconnected resources that may be programmed to perform various functions, such as the procedures, methods, functions, etc. of the various embodiments discussed herein. In such embodiments, the circuitry of application circuitry 1205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry 1210 may be implemented, for example, as a solder-down substrate including one or more integrated circuits, a single packaged integrated circuit soldered to a main circuit board or a multi-chip module containing two or more integrated circuits. Although not shown, baseband circuitry 1210 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 1210 may include protocol processing circuitry with one or more instances of control circuitry (not shown) to provide control functions for the digital baseband circuitry and/or radio frequency circuitry (for example, the radio front end modules 1215).

User interface circuitry 1250 may include one or more user interfaces designed to enable user interaction with the system 1200 or peripheral component interfaces designed to enable peripheral component interaction with the system 1200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 1215 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 1215. The RFEMs 1215 may incorporate both millimeter wave antennas and sub-millimeter wave antennas.

The memory circuitry 1220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 1220 may be implemented as one or more of solder down packaged integrated circuits, socketed memory modules and plug-in memory cards.

The PMIC 1225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1230 may provide for electrical power drawn from a network cable to provide both power supply and data connectivity to the infrastructure equipment 1200 using a single cable.

The network controller circuitry 1235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1200 via network interface connector 1240 using a physical connection, which may be electrical (commonly referred to as a "copper interconnect"), optical, or wireless. The network controller circuitry 1235 may include one or more dedicated processors and/or FPGAs to communicate using one or more of the aforementioned protocol. In some implementations, the network controller circuitry 1235 may include multiple controllers to provide connectivity to other networks using the same or different protocols.

The positioning circuitry 1245 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1245 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 1245 and/or positioning circuitry implemented by UEs 1101, 1102, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 1245 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 1245 may provide data to application circuitry 1205, which may include one or more of position data or time data. Application circuitry 1205 may use the time data to synchronize operations with other radio base stations (e.g., RAN nodes 1111, 1112, or the like).

The components shown by FIG. 12 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 13:
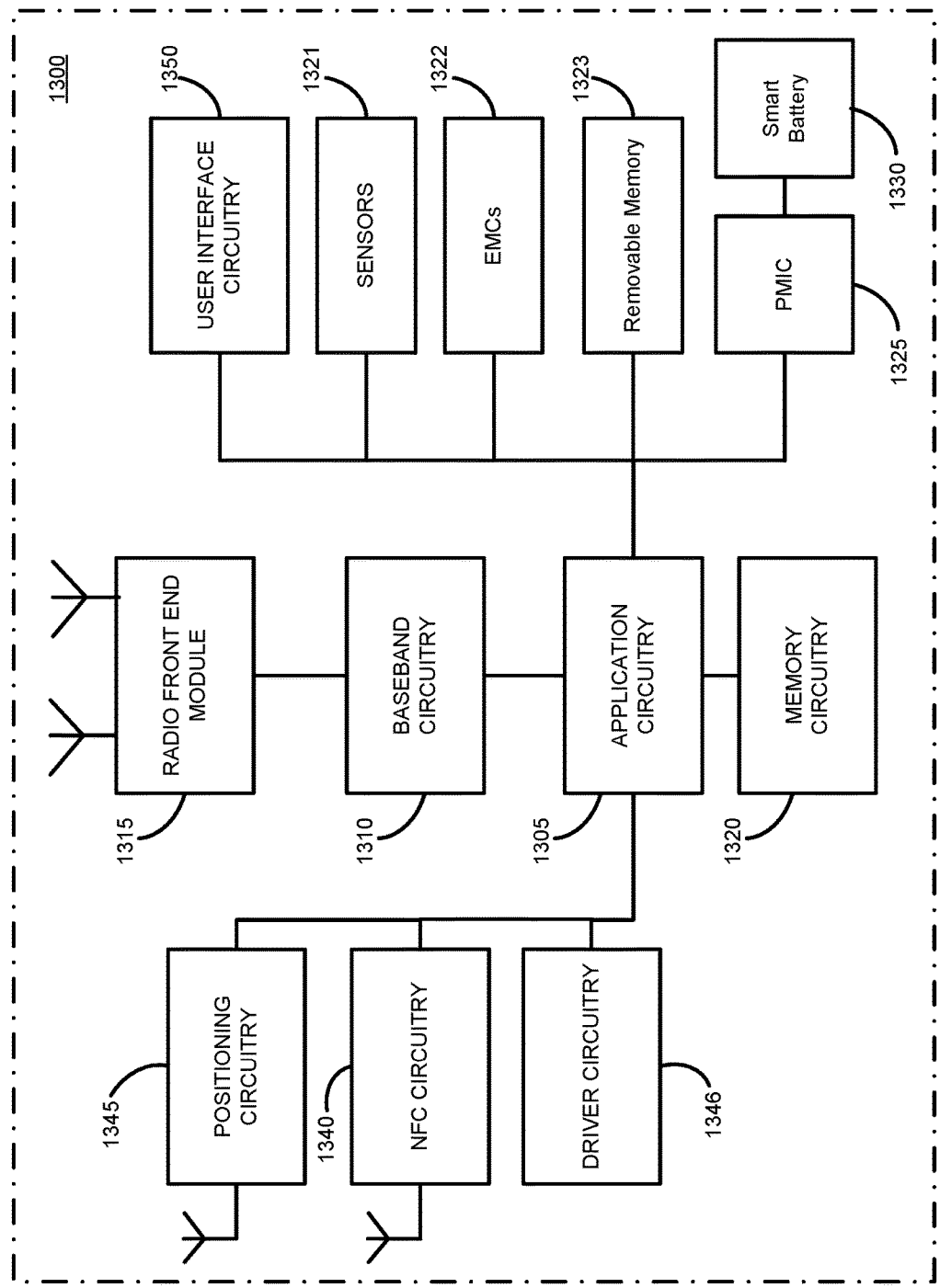
FIG. 13 illustrates an example of a platform in accordance with various embodiments.

FIG. 13 illustrates an example of a platform 1300 (or "device 1300") in accordance with various embodiments. In embodiments, the computer platform 1300 may be suitable for use as UEs 1101, 1102, application servers 1130, and/or any other element/device discussed herein. The platform 1300 may include any combinations of the components shown in the example. The components of platform 1300 may be implemented as integrated circuits (ICs), portions thereof, discrete electronic devices, or other modules, logic, hardware, software, firmware, or a combination thereof adapted in the computer platform 1300, or as components otherwise incorporated within a chassis of a larger system. The block diagram of FIG. 13 is intended to show a high level view of components of the computer platform 1300. However, some of the components shown may be omitted, additional components may be present, and different arrangement of the components shown may occur in other implementations.

The application circuitry 1305 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I²C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 1300. In some embodiments, processors of application circuitry 1205/1305 may process IP data packets received from an EPC or 5GC.

Application circuitry 1305 may be or may include a microprocessor, a multi-core processor, a multithreaded processor, an ultra-low voltage processor, an embedded processor, or other known processing element. In one example, the application circuitry 1305 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 1305 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 1305 may be a part of a system on a chip (SoC) in which the application circuitry 1305 and other components are formed into a single integrated circuit, or a single package, such as the Edison™ or Galileo™ SoC boards from Intel® Corporation.

Additionally or alternatively, application circuitry 1305 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1305 may comprise logic blocks or logic fabric including other interconnected resources that may be programmed to perform various functions, such as the procedures, methods, functions, etc. of the various embodiments discussed herein. In such embodiments, the circuitry of application circuitry 1305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry 130 may be implemented, for example, as a solder-down substrate including one or more integrated circuits, a single packaged integrated circuit soldered to a main circuit board or a multi-chip module containing two or more integrated circuits. Although not shown, baseband circuitry 130 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 130 may include protocol processing circuitry with one or more instances of control circuitry (not shown) to provide control functions for the digital baseband circuitry and/or radio frequency circuitry (for example, the radio front end modules 135).

The radio front end modules (RFEMs) 135 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 135. The RFEMs 135 may incorporate both millimeter wave antennas and sub-millimeter wave antennas.

The memory circuitry 140 may include any number and type of memory devices used to provide for a given amount of system memory. As examples, the memory circuitry 140 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 140 may be developed in accordance with a Joint Electron Devices Engineering Council (JEDEC) low power double data rate (LPDDR)-based design, such as LPDDR2, LPDDR3, LPDDR4, or the like. Memory circuitry 140 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 140 may be on-die memory or registers associated with the application circuitry 1305. To provide for persistent storage of information such as data, applications, operating systems and so forth, memory circuitry 140 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 1300 may incorporate the three-dimensional (3D) cross-point (XPOINT) memories from Intel® and Micron®.

Removable memory circuitry 143 may include devices, circuitry, enclosures/housings, ports or receptacles, etc. used to coupled portable data storage devices with the platform 1300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1300 may also include interface circuitry (not shown) that is used to connect external devices with the platform 1300. The external devices connected to the platform 1300 via the interface circuitry may include sensors 141, such as accelerometers, level sensors, flow sensors, temperature sensors, pressure sensors, barometric pressure sensors, and the like. The interface circuitry may be used to connect the platform 1300 to electro-mechanical components (EMCs) 142, which may allow platform 1300 to change its state, position, and/or orientation, or move or control a mechanism or system. The EMCs 142 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1300 may be configured to operate one or more EMCs 142 based on one or more captured events and/or instructions or control signals received from a service provider and/or various clients.

In some implementations, the interface circuitry may connect the platform 1300 with positioning circuitry 1345, which may be the same or similar as the positioning circuitry 1245 discussed with regard to FIG. 12.

In some implementations, the interface circuitry may connect the platform 1300 with near-field communication (NFC) circuitry 1340, which may include an NFC controller coupled with an antenna element and a processing device. The NFC circuitry 1340 may be configured to read electronic tags and/or connect with another NFC-enabled device.

The driver circuitry 1346 may include software and hardware elements that operate to control particular devices that are embedded in the platform 1300, attached to the platform 1300, or otherwise communicatively coupled with the platform 1300. The driver circuitry 1346 may include individual drivers allowing other components of the platform 1300 to interact or control various input/output (I/O) devices that may be present within, or connected to, the platform 1300. For example, driver circuitry 1346 may include a display driver to control and allow access to a display device, a touchscreen driver to control and allow access to a touchscreen interface of the platform 1300, sensor drivers to obtain sensor readings of sensors 141 and control and allow access to sensors 141, EMC drivers to obtain actuator positions of the EMCs 142 and/or control and allow access to the EMCs 142, a camera driver to control and allow access to an embedded image capture device, audio drivers to control and allow access to one or more audio devices.

The power management integrated circuitry (PMIC) 145 (also referred to as "power management circuitry 145") may manage power provided to various components of the platform 1300. In particular, with respect to the baseband circuitry 130, the PMIC 145 may control power-source selection, voltage scaling, battery charging, or DC-to-DC conversion. The PMIC 145 may often be included when the platform 1300 is capable of being powered by a battery 1330, for example, when the device is included in a UE 1101, 1102.

In some embodiments, the PMIC 145 may control, or otherwise be part of, various power saving mechanisms of the platform 1300. For example, if the platform 1300 is in an RRC_Connected state, where it is still connected to the RAN node as it expects to receive traffic shortly, then it may enter a state known as Discontinuous Reception Mode (DRX) after a period of inactivity. During this state, the platform 1300 may power down for brief intervals of time and thus save power. If there is no data traffic activity for an extended period of time, then the platform 1300 may transition off to an RRC_Idle state, where it disconnects from the network and does not perform operations such as channel quality feedback, handover, etc. The platform 1300 goes into a very low power state and it performs paging where again it periodically wakes up to listen to the network and then powers down again. The platform 1300 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1330 may power the platform 1300, although in some examples the platform 1300 may be mounted deployed in a fixed location, and may have a power supply coupled to an electrical grid. The battery 1330 may be a lithium ion battery, a metal-air battery, such as a zinc-air battery, an aluminum-air battery, a lithium-air battery, and the like. In some implementations, such as in V2X applications, the battery 1330 may be a typical lead-acid automotive battery.

In some implementations, the battery 1330 may be a "smart battery," which includes or is coupled with a Battery Management System (BMS) or battery monitoring integrated circuitry. The BMS may be included in the platform 1300 to track the state of charge (SoCh) of the battery 1330. The BMS may be used to monitor other parameters of the battery 1330 to provide failure predictions, such as the state of health (SoH) and the state of function (SoF) of the battery 1330. The BMS may communicate the information of the battery 1330 to the application circuitry 1305 or other components of the platform 1300. The BMS may also include an analog-to-digital (ADC) convertor that allows the application circuitry 1305 to directly monitor the voltage of the battery 1330 or the current flow from the battery 1330. The battery parameters may be used to determine actions that the platform 1300 may perform, such as transmission frequency, network operation, sensing frequency, and the like.

A power block, or other power supply coupled to an electrical grid may be coupled with the BMS to charge the battery 1330. In some examples, the power block 1128 may be replaced with a wireless power receiver to obtain the power wirelessly, for example, through a loop antenna in the computer platform 1300. In these examples, a wireless battery charging circuit may be included in the BMS. The specific charging circuits chosen may depend on the size of the battery 1330, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 1300 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I²C interface, an SPI interface, point to point interfaces, and a power bus, among others.

Figure 14:
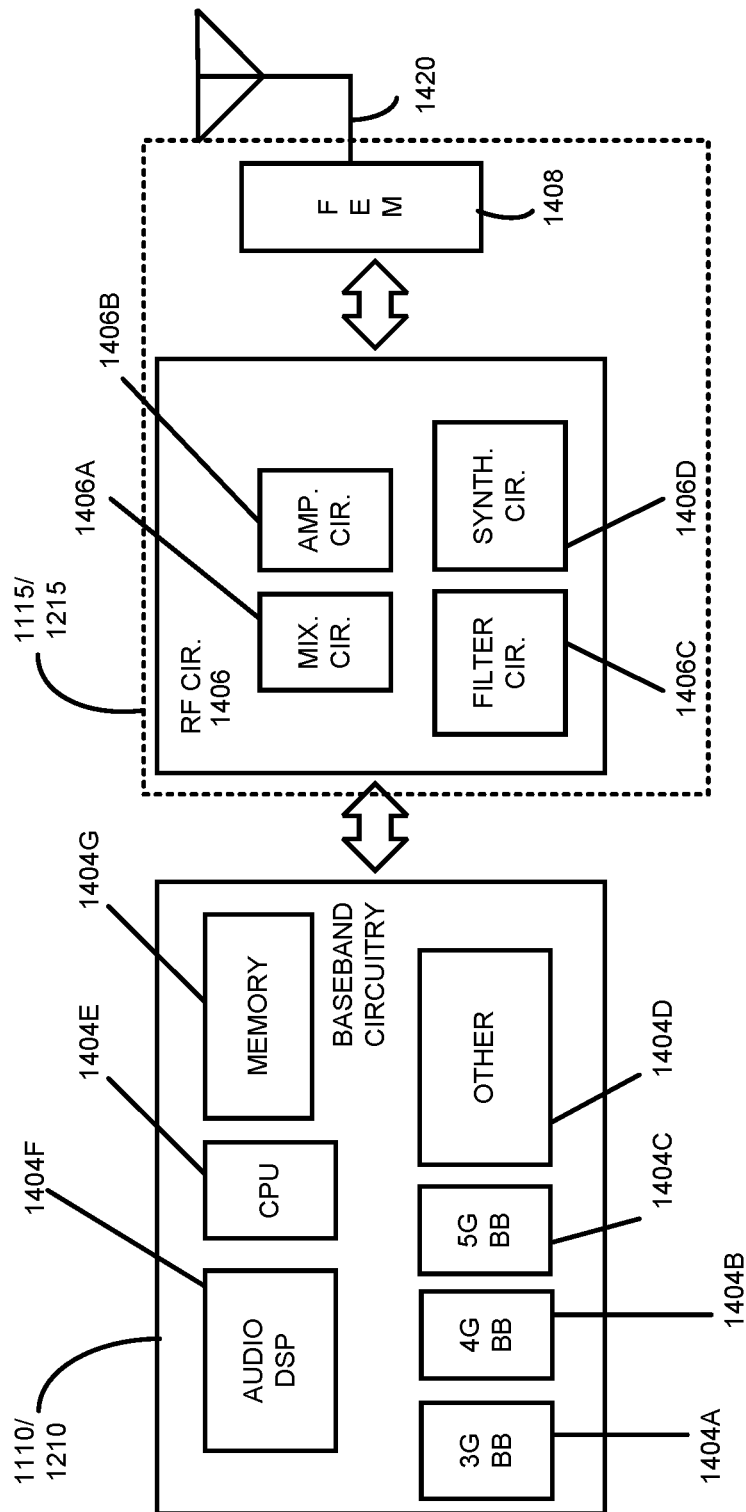
FIG. 14 illustrates example components of baseband circuitry and radio front end modules in accordance with various embodiments.

FIG. 14 illustrates example components of baseband circuitry 1210/130 and radio front end modules (RFEM) 1215/135 in accordance with some embodiments. As shown, the RFEM 1215/135 may include Radio Frequency (RF) circuitry 1306, front-end module (FEM) circuitry 1308, one or more antennas 130 coupled together at least as shown.

The baseband circuitry 1210/130 may include circuitry such as, but not limited to, one or more single-core or multi-core processors. The baseband circuitry 1210/130 may include one or more baseband processors or control logic to process baseband signals received from a receive signal path of the RF circuitry 1306 and to generate baseband signals for a transmit signal path of the RF circuitry 1306. Baseband processing circuitry 1210/130 may interface with the application circuitry 1205/1305 for generation and processing of the baseband signals and for controlling operations of the RF circuitry 1306. For example, in some embodiments, the baseband circuitry 1210/130 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). The baseband circuitry 1210/130 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1210/130 may include Fast-Fourier Transform (FFT), precoding, or constellation mapping/demapping functionality. In some embodiments, encoding/decoding circuitry of the baseband circuitry 1210/130 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1210/130 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1210/130 and the application circuitry 1205/1305 may be implemented together such as, for example, on a system on a chip (SoC).

In some embodiments, the baseband circuitry 1210/130 may provide for communication compatible with one or more radio technologies. For example, in some embodiments, the baseband circuitry 1210/130 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1210/130 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1210/130. RF circuitry 1306 may also include a transmit signal path which may include circuitry to up-convert baseband signals provided by the baseband circuitry 1210/130 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1210/130 for further processing. In some embodiments, the output baseband signals may be zero-frequency baseband signals, although this is not a requirement. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1210/130 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1210/130 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a requirement. Divider control input may be provided by either the baseband circuitry 1210/130 or the applications processor 1205/1305 depending on the desired output frequency. In some embodiments, a divider control input (e.g., N) may be determined from a look-up table based on a channel indicated by the applications processor 1205/1305.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 130, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 130. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 130).

Processors of the application circuitry 1205/1305 and processors of the baseband circuitry 1210/130 may be used to execute elements of one or more instances of a protocol stack. For example, processors of the baseband circuitry 1210/130, alone or in combination, may be used execute Layer 3, Layer 2, or Layer 1 functionality, while processors of the baseband circuitry 1210/130 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 15:
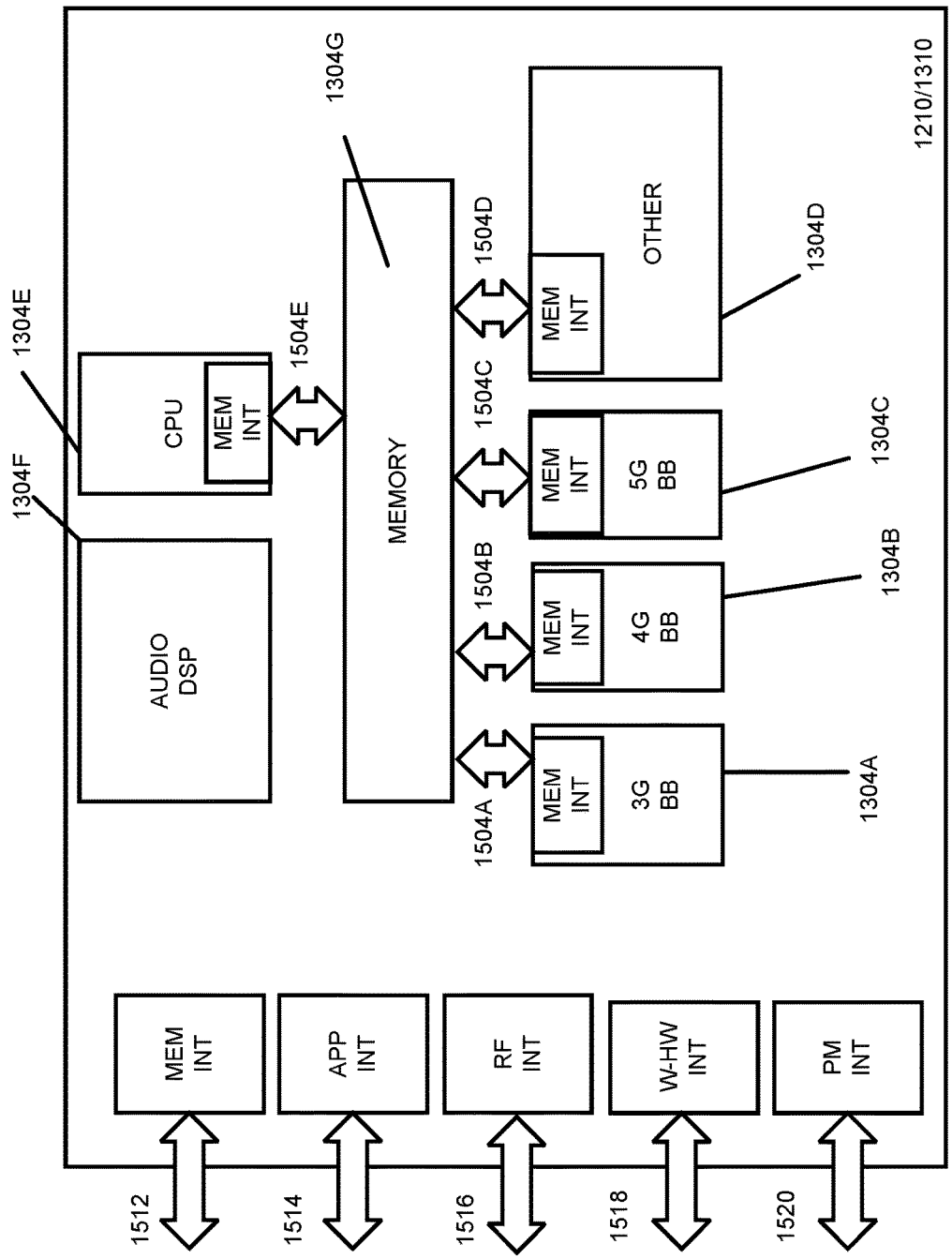
FIG. 15 illustrates example interfaces of baseband circuitry in accordance with various embodiments.

FIG. 15 illustrates example interfaces of baseband circuitry in accordance with some embodiments. As discussed above, the baseband circuitry 1210/130 of FIGS. 12-13 may comprise processors 1304A-1304E and a memory 1304G utilized by said processors. Each of the processors 1304A-1304E may include a memory interface, 1504A-1504E, respectively, to send/receive data to/from the memory 1304G.

The baseband circuitry 1210/130 may further include one or more interfaces to communicatively couple to other circuitries/devices, such as a memory interface 1512 (e.g., an interface to send/receive data to/from memory external to the baseband circuitry 1210/130), an application circuitry interface 1514 (e.g., an interface to send/receive data to/from the application circuitry 1205/1305 of FIGS. 12-13), an RF circuitry interface 1516 (e.g., an interface to send/receive data to/from RF circuitry 1306 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMIC 145.

Figure 16:
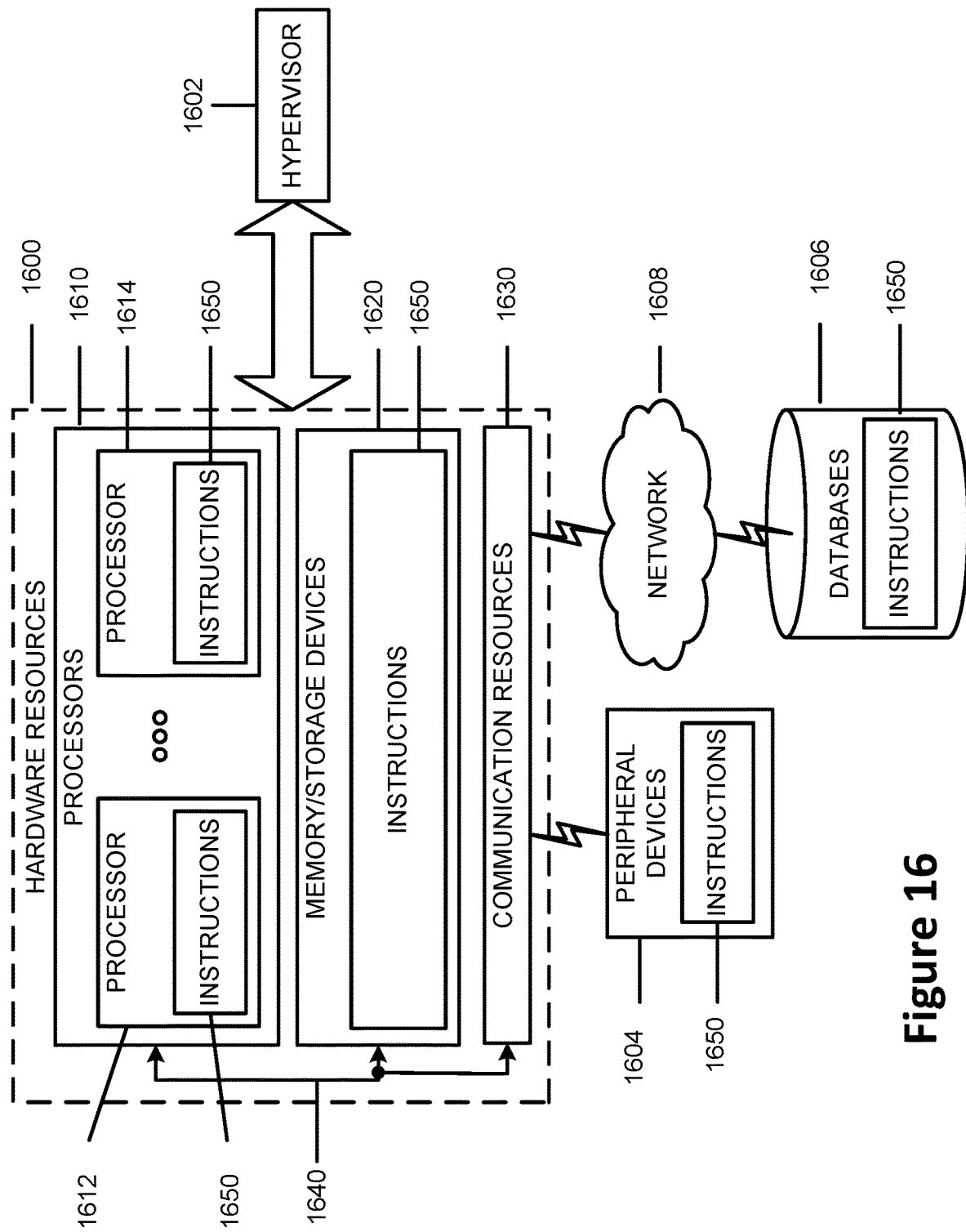
FIG. 16 is a block diagram illustrating components, according to some example embodiments, able to read instructions from a machine-readable or computer-readable medium (e.g., a non-transitory machine-readable storage medium) and perform any one or more of the methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1602 may be executed to provide an execution environment for one or more network slices/subslices to utilize the hardware resources 1600. A "virtualized resource" may refer to compute, storage, and/or network resources provided by virtualization infrastructure to an application, device, system, etc.

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614.

The memory/storage devices 1620 may include main memory, disk storage, or any suitable combination thereof. The memory/storage devices 1620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes a method comprising receiving an indication of capability information for a user equipment (UE); constructing, based on the capability information, a configuration message to configure the UE with one or more sub-physical resource block (PRB) configurations for a physical uplink shared channel (PUSCH) in even further enhanced machine type communication (efeMTC), wherein a first sub-PRB configuration of the one or more sub-PRB configurations is a 2 out of 3 subcarrier configuration; and causing the configuration message to be sent to the UE.

Example 2 may include the method of example 1 or some other example herein, wherein the indication of capability information is to indicate support for 2 out of 3 subcarrier configuration and a 3-subcarrier configuration or a 6-subcarrier configuration.

Example 3 may include the method of example 1 or some other example herein, further comprising: causing an allocation message to be sent to the UE to indicate 2 out of 3 allocated subcarriers for a PUSCH transmission; and receiving the PUSCH transmission from the UE on the 2 out of 3 allocated subcarriers with a 15 kHz subcarrier spacing.

Example 4 may include the method of example 1 or some other example herein, wherein the one or more sub-PRB configurations further includes a 3-subcarrier configuration or a 6-subcarrier configuration.

Example 5 may include the method of example 1 or some other example herein, wherein the first sub-PRB configuration allows for 2 out of 3 allocated subcarriers with respect to non-overlapping 3-subcarrier sets across a PRB.

Example 6 may include the method of example 1 or some other example herein, further comprising generating and causing transmission of downlink control information that includes M bits in a subcarrier indication field to indicate a set of allocated subcarriers.

Example 7 may include the method of example 1 or some other example herein, further comprising indicating the set of allocated subcarriers based on the following table:

| $I_{sc}$ | $n_{sc}$ |
|---|---|
| 0-3 | $3I_{sc} + \{Y, Y+1\}$ |
| 4-7 | $3(I_{sc} - 4) + \{0, 1, 2\}$ |
| 8-9 | $6(I_{sc} - 8) + \{0, 1, 2, 3, 4, 5\}$, | wherein $n_{sc}$ is the set of allocated subcarriers, $I_{sc}$ is indicated by the M bits in the subcarrier indication field, and Y is 0 or 1.

Example 8 may include a method comprising mapping a demodulation reference signal (DMRS) to resource elements within the sub-physical PRB PUSCH allocation; and causing the DMRS to be transmitted.

Example 9 may include the method of example 8 or some other example herein, wherein the DMRS has a length-16 sequence.

Example 10 may include the method of example 8 or some other example herein, wherein each of the plurality of consecutive slots are 4 milliseconds.

Example 11 may include the method of example 8 or some other example herein, wherein the sub-PRB PUSCH allocation comprises 2 out of 3 allocated subcarriers.

Example 12 may include the method of example 8 or some other example herein, wherein the DMRS is a first DMRS and the method further comprises: mapping the first DMRS to a first subcarrier of the 2 out of 3 allocated subcarriers; and mapping a second DMRS to a second subcarrier of the 2 out of 3 allocated subcarriers.

Example 13 may include the method of example 8 or some other example herein, wherein the DMRS is mapped to one subcarrier.

Example 14 may include the method of example 8 or some other example herein, wherein the DMRS comprises 2-tone binary phase shift keying (BPSK) DMRS symbols and the method further comprises: applying discrete Fourier transforming pre-coding to the 2-tone BPSK DMRS symbols; and causing the DMRS to be transmitted on one subcarrier.

Example 15 may include the method of example 8 or some other example herein, further comprising mapping the DMRS to resource elements in fourth symbol in each of a plurality of consecutive slots.

Example 16 may include a method comprising allocating, to a user equipment (UE) that is to operate in coverage enhancement mode B, two or four resource units for a sub-physical resource block (PRB) physical uplink shared channel (PUSCH); and providing, to the UE, an indication of a transport block size (TB S) value with reference to columns of a TBS table that are associated with 3 and 6 PRBs.

Example 17 may include the method of example 16 or some other example herein, wherein a first column of the TBS is associated with 3 PRBs and includes TBS values: 56, 88, 144, 176, 208, 224, 256, 328, 392, 456, and 504.

Example 18 may include the method of example 16 or some other example herein, wherein a first column of the TBS is associated with 6 PRBs and includes TBS values: 152, 208, 256, 328, 408, 504, 600, 712, 808, and 936.

Example 19 may include a method comprising receiving a signal that includes an indication of a sub-physical resource block (PRB) allocation for physical uplink shared channel (PUSCH) in even further enhanced machine type communication (efeMTC); and generating an uplink (UL) signal for transmission based at least in part on the indication of the sub-PRB allocation for PUSCH.

Example 20 may include the method of example 19 or some other example herein, wherein a PUSCH with 2 out of 3 allocated subcarriers is supported for efeMTC.

Example 21 may include the method of example 20 or some other example herein, wherein the PUSCH with 2 out of 3 allocated subcarriers is configured together with sub-PRB allocation with 3 or 6 subcarriers.

Example 22 may include the method of example 19 or some other example herein, wherein the PUSCH with 2 out of 3 allocated subcarriers is configured separately from other sub-PRB allocations.

Example 23 may include one or more non-transitory computer-readable media comprising instructions to cause an electronic device, upon execution of the instructions by one or more processors of the electronic device, to perform one or more elements of a method described in or related to any of examples 1-22, or any other method or process described herein.

Example 24 may include an apparatus comprising logic, modules, or circuitry to perform one or more elements of a method described in or related to any of examples 1-22, or any other method or process described herein.

Example 25 may include a method, technique, or process as described in or related to any of examples 1-22, or portions or parts thereof.

Example 26 may include an apparatus comprising: one or more processors and one or more computer readable media comprising instructions that, when executed by the one or more processors, cause the one or more processors to perform the method, techniques, or process as described in or related to any of examples 1-22, or portions thereof.

Example 27 may include a signal as described in or related to any of examples 1-22, or portions or parts thereof.

Example 28 may include a signal in a wireless network as shown and described herein.

Example 29 may include a method of communicating in a wireless network as shown and described herein.

Example 30 may include a system for providing wireless communication as shown and described herein.

Example 31 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. One or more non-transitory computer-readable media (NTCRM) having instructions that, when executed by one or more processors, cause a user equipment (UE) to:
   map a demodulation reference signal (DMRS) to resource elements within a sub-physical resource block (PRB) physical uplink shared channel (PUSCH) allocation based on a sub-PRB configuration of a PUSCH allocation, wherein the sub-PRB configuration is a 2 out of 3 subcarrier configuration, wherein the 2 out of 3 subcarrier configuration indicates a configuration of 2 adjacent subcarriers out of 3 allocated subcarriers including a subcarrier x, a subcarrier x+1, and a subcarrier x+2; and
   cause the DMRS to be transmitted.

2. The one or more NTCRM of claim 1, wherein the DMRS has a length-16 sequence, or a length-12 sequence.

3. The one or more NTCRM of claim 1, wherein to map the DMRS includes to map the DMRS to resource elements in a fourth symbol in each of a plurality of consecutive slots, and wherein each of the plurality of consecutive slots are 4 milliseconds.

4. The one or more NTCRM of claim 1, wherein the sub-PRB PUSCH allocation comprises 2 out of 3 allocated subcarriers.

5. The one or more NTCRM of claim 1, wherein the DMRS is a first DMRS and the instructions, when executed, are further to cause the UE to:
   map the first DMRS to a first subcarrier of the 2 out of 3 allocated subcarriers; and
   map a second DMRS to a second subcarrier of the 2 out of 3 allocated subcarriers.

6. The one or more NTCRM of claim 1, wherein the DMRS is mapped to one subcarrier.

7. The one or more NTCRM of claim 1, wherein the DMRS comprises 2-tone binary phase shift keying (BPSK) DMRS symbols and the instructions, when executed, are further to cause the UE to:
   apply discrete Fourier transforming pre-coding to the 2-tone BPSK DMRS symbols; and
   cause the DMRS to be transmitted on one subcarrier.

8. The one or more NTCRM of claim 1, wherein the instructions, when executed, are further to cause the UE to map the DMRS to resource elements in a fourth symbol in each of a plurality of consecutive slots.

9. An apparatus, comprising:
   memory to include information to configure a user equipment (UE) with a plurality of sub-physical resource block (PRB) configurations; and
   baseband circuitry to:
      receive an indication of capability information for the UE with respect to a sub-PRB allocation;
      construct, based on the capability information, a configuration message to configure the UE with one or more sub-PRB configurations for a physical uplink shared channel (PUSCH), wherein a first sub-PRB configuration of the one or more sub-PRB configurations is a 2 out of 3 subcarrier configuration, wherein the 2 out of 3 subcarrier configuration indicates a configuration of 2 adjacent subcarriers out of 3 allocated subcarriers including a subcarrier x, a subcarrier x+1, and a subcarrier x+2, and wherein resource elements within a sub-PRB determined by the first sub-PRB configuration are used to carry a demodulation reference signal (DMRS) from the UE; and
      cause the configuration message to be sent to the UE.

10. The apparatus of claim 9, wherein the baseband circuitry is further configured to:
    cause an allocation message to be sent to the UE to indicate the 2 out of 3 allocated subcarriers; and
    receive the PUSCH transmission from the UE on the 2 out of 3 allocated subcarriers, with a 15 kHz subcarrier spacing.

11. The apparatus of claim 9, wherein the 2 out of 3 allocated subcarriers are based on a plurality of non-overlapping sets of subcarriers, and the 3 allocated subcarriers are based on the plurality of non-overlapping sets of subcarriers.

12. The apparatus of claim 11, wherein the plurality of non-overlapping sets of subcarriers include subcarrier sets $\{0, 1, 2\}$, $\{3, 4, 5\}$, $\{6, 7, 8\}$ and $\{9, 10, 11\}$.

13. The apparatus of claim 9, wherein the baseband circuitry is further configured to:
    generate and cause transmission of downlink control information that includes M bits in a subcarrier indication field to indicate a set of allocated subcarriers.

14. The apparatus of claim 9, wherein the indication of capability information is to indicate support for a 2 out of 3 subcarrier configuration, a 3-subcarrier configuration, or a 6-subcarrier configuration.

15. The apparatus of claim 9, wherein the one or more sub-PRB configurations further include a 3-subcarrier configuration or a 6-subcarrier configuration.

16. The apparatus of claim 9, wherein the baseband circuitry is further configured to:

indicate the set of allocated subcarriers based on the following table:

| $I_{sc}$ | $n_{sc}$ |
|---|---|
| 0-3 | $3I_{sc} + \{Y, Y + 1\}$ |
| 4-7 | $3(I_{sc} - 4) + \{0, 1, 2\}$ |
| 8-9 | $6(I_{sc} - 8) + \{0, 1, 2, 3, 4, 5\}$ | wherein $n_{SC}$ is the set of allocated subcarriers, $I_{SC}$ is indicated by the M bits in the subcarrier indication field, and Y is 0 or 1.

17. A method, comprising:

mapping a demodulation reference signal (DMRS) to resource elements within a sub-physical resource block (PRB) physical uplink shared channel (PUSCH) allocation based on a sub-PRB configuration of a PUSCH allocation, wherein the sub-PRB configuration is a 2 out of 3 subcarrier configuration that indicates a configuration of 2 adjacent subcarriers out of 3 allocated subcarriers including a subcarrier x, a subcarrier x+1, and a subcarrier x+2; and transmitting the DMRS to a base station.

18. The method of claim 17, wherein the mapping the DMRS includes mapping the DMRS to resource elements in a fourth symbol of a plurality of consecutive slots.

19. The method of claim 17, wherein the sub-PRB PUSCH allocation comprises 2 out of 3 allocated subcarriers.

20. The method of claim 17, wherein the DMRS is a first DMRS, the method further comprising:

mapping the first DMRS to a first subcarrier of the 2 out of 3 allocated subcarriers; and mapping a second DMRS to a second subcarrier of the 2 out of 3 allocated subcarriers.

* * * * *